US012211426B2

(12) United States Patent
Li et al.

(10) Patent No.: US 12,211,426 B2
(45) Date of Patent: Jan. 28, 2025

(54) DISPLAY METHOD, STRUCTURE AND APPARATUS WITH DATA VOLTAGE COMPENSATION BASED ON DRIVING TRANSISTOR THRESHOLD VOLTAGE

(71) Applicants: Hefei BOE Joint Technology Co., Ltd., Anhui (CN); BOE TECHNOLOGY GROUP CO., LTD., Beijing (CN)

(72) Inventors: Huihui Li, Beijing (CN); Wenchao Bao, Beijing (CN); Song Meng, Beijing (CN); Jingbo Xu, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/922,502

(22) PCT Filed: Sep. 8, 2021

(86) PCT No.: PCT/CN2021/117308
§ 371 (c)(1),
(2) Date: Oct. 31, 2022

(87) PCT Pub. No.: WO2023/035159
PCT Pub. Date: Mar. 16, 2023

(65) Prior Publication Data
US 2024/0221607 A1 Jul. 4, 2024

(51) Int. Cl.
*G09G 3/32* (2016.01)

(52) U.S. Cl.
CPC ........... *G09G 3/32* (2013.01); *G09G 2310/08* (2013.01); *G09G 2320/0242* (2013.01);
(Continued)

(58) Field of Classification Search
CPC ................. G09G 3/32; G09G 2310/08; G09G 2320/0242; G09G 2320/0295; G09G 2320/0693; G09G 2330/10
See application file for complete search history.

(56) References Cited

U.S. PATENT DOCUMENTS 11,984,064 B2 * 5/2024 Kawashima ............. G09G 3/32
2015/0145845 A1 * 5/2015 Nam .................... G09G 3/3233 345/212

(Continued)

*Primary Examiner* — Liliana Cerullo
(74) *Attorney, Agent, or Firm* — Dority & Manning, P.A.

(57) ABSTRACT

An image dis play method applied to a display apparatus includes: establishing a correspondence table between a threshold voltage of a sub-pixel and a compensation voltage, the correspondence table including at least one adjustment interval, an adjustment interval including a first and second threshold voltage endpoint values, the first threshold voltage endpoint value being less than the second threshold voltage endpoint value; acquiring a threshold voltage of each sub-pixel; determining an adjustment interval in which the acquired threshold voltage is located according to the corresponding table; acquiring a compensation voltage corresponding to the acquired threshold voltage according to the correspondence table and the determined adjustment interval; and determining, in a case where the display apparatus is to display a black image, a data voltage required by each sub-pixel according to the acquired threshold voltage and the acquired compensation voltage.

18 Claims, 5 Drawing Sheets

(52) U.S. Cl.
CPC ............... *G09G 2320/0295* (2013.01); *G09G 2320/0693* (2013.01); *G09G 2330/10* (2013.01)

(56) References Cited

U.S. PATENT DOCUMENTS

| | | | | |
|---|---|---|---|---|
| 2016/0189623 | A1* | 6/2016 | Miwa | G09G 3/3233<br>345/212 |
| 2019/0130837 | A1* | 5/2019 | Chen | G09G 3/3233 |
| 2021/0201825 | A1* | 7/2021 | Yun | G09G 3/3233 |
| 2023/0066738 | A1* | 3/2023 | Park | G09G 5/363 |

* cited by examiner

DISPLAY METHOD, STRUCTURE AND APPARATUS WITH DATA VOLTAGE COMPENSATION BASED ON DRIVING TRANSISTOR THRESHOLD VOLTAGE

CROSS-REFERENCE TO RELATED APPLICATION

The present application is a national phase entry under 35 USC 371 of International Patent Application No. PCT/CN2021/117308, filed on Sep. 8, 2021, which is incorporated herein by reference in its entirety.

TECHNICAL FIELD

The present disclosure relates to the field of display technologies, and in particular, to an image display method, an image display structure, a display apparatus and a computer-readable storage medium.

BACKGROUND

Organic light-emitting diodes (OLEDs) have been widely used in the display field due to their self-luminescence, low driving voltage, high luminous efficiency, quick response, flexible display, and other advantages.

SUMMARY

In an aspect, an image display method is provided, which is applied to a display apparatus. The display apparatus includes a plurality of sub-pixels. The image display method includes: establishing a correspondence table between a threshold voltage of a sub-pixel and a compensation voltage, the correspondence table including at least one adjustment interval, an adjustment interval including a first threshold voltage endpoint value and a second threshold voltage endpoint value, the first threshold voltage endpoint value being less than the second threshold voltage endpoint value, and in the adjustment interval, the compensation voltage being a constant value; acquiring a threshold voltage of each sub-pixel; determining an adjustment interval in which the acquired threshold voltage is located according to the correspondence table; acquiring a compensation voltage corresponding to the acquired threshold voltage according to the correspondence table and the determined adjustment interval; and determining, in a case where the display apparatus is to display a black image, a data voltage required by each sub-pixel according to the acquired threshold voltage and the acquired compensation voltage.

In some embodiments, the at least one adjustment interval includes a plurality of adjustment intervals. Two adjacent adjustment intervals are respectively a first adjustment interval and a second adjustment interval. An average value of threshold voltages corresponding to the first adjustment interval is less than an average value of threshold voltages corresponding to the second adjustment interval. A compensation voltage corresponding to the first adjustment interval is less than a compensation voltage corresponding to the second adjustment interval.

In some embodiments, the plurality of sub-pixels includes a red sub-pixel, a green sub-pixel and a blue sub-pixel. The correspondence table includes correspondence relationships between threshold voltages of sub-pixels of different colors and the compensation voltage. Determining the adjustment interval in which the acquired threshold voltage is located includes: determining a color displayed by each sub-pixel;

determining a correspondence relationship corresponding to the color displayed by each sub-pixel; and determining the adjustment interval in which the acquired threshold voltage is located in the correspondence relationship according to the acquired threshold voltage.

In some embodiments, a correspondence relationship corresponding to the blue sub-pixel includes a first minimum threshold voltage endpoint value. A correspondence relationship corresponding to the red sub-pixel includes a second minimum threshold voltage endpoint value. A correspondence relationship corresponding to the green sub-pixel includes a third minimum threshold voltage endpoint value. The first minimum threshold voltage endpoint value is greater than the second minimum threshold voltage endpoint value. The first minimum threshold voltage endpoint value is greater than the third minimum threshold voltage endpoint value. The second minimum threshold voltage endpoint value and the third minimum threshold voltage endpoint value are substantially equal.

In some embodiments, a correspondence relationship corresponding to the blue sub-pixel includes a first maximum compensation voltage value. A correspondence relationship corresponding to the red sub-pixel includes a second maximum compensation voltage value. A correspondence relationship corresponding to the green sub-pixel includes a third maximum compensation voltage value. The first maximum compensation voltage value is less than the second maximum compensation voltage value. The first maximum compensation voltage value is less than the third maximum compensation voltage value. The second maximum compensation voltage value and the third maximum compensation voltage value are substantially equal.

In some embodiments, the plurality of sub-pixels further include a white sub-pixel. A correspondence relationship corresponding to the white sub-pixel includes a fourth minimum threshold voltage endpoint value. A correspondence relationship corresponding to the blue sub-pixel includes a first minimum threshold voltage endpoint value, a correspondence relationship corresponding to the red sub-pixel includes a second minimum threshold voltage endpoint value, and a correspondence relationship corresponding to the green sub-pixel includes a third minimum threshold voltage endpoint value, the first minimum threshold voltage endpoint value is greater than the fourth minimum threshold voltage endpoint value, the fourth minimum threshold voltage endpoint value and the second minimum threshold voltage endpoint value are substantially equal, and the fourth minimum threshold voltage endpoint value and the third minimum threshold voltage endpoint value are substantially equal.

In some embodiments, the correspondence relationship corresponding to the white sub-pixel includes a fourth maximum compensation voltage value. A correspondence relationship corresponding to the blue sub-pixels includes a first maximum compensation voltage value, a correspondence relationship corresponding to the red sub-pixel includes a second maximum compensation voltage value, and a correspondence relationship corresponding to the green sub-pixel includes a third maximum compensation voltage value, the first maximum compensation voltage value is less than the fourth maximum compensation voltage value, the fourth maximum compensation voltage value and the second maximum compensation voltage value are substantially equal, and the fourth maximum compensation voltage value and the third maximum compensation voltage value are substantially equal.

In some embodiments, the correspondence table further includes correspondence relationships between aging degrees of the sub-pixels of different colors and the compensation voltage. After the color displayed by each sub-pixel is determined, the image display method further includes: determining an aging degree of each sub-pixel; and acquiring a compensation voltage corresponding to the aging degree according to the correspondence relationships and the aging degree. Determining the data voltage required by each sub-pixel according to the acquired threshold voltage and the acquired compensation voltage includes: determining the data voltage required by each sub-pixel according to the acquired threshold voltage, the compensation voltage corresponding to the acquired threshold voltage, and the compensation voltage corresponding to the aging degree.

In some embodiments, the aging degree of each sub-pixel and the compensation voltage corresponding to the aging degree are negatively correlated.

In some embodiments, each sub-pixel includes a light-emitting device. Determining the aging degree of each sub-pixel includes: determining a target light-emitting luminance of the light-emitting device; acquiring an actual light-emitting luminance of the light-emitting device; and determining an aging degree of the light-emitting device according to the target light-emitting luminance and the actual light-emitting luminance.

In some embodiments, acquiring the threshold voltage of each sub-pixel includes: acquiring the threshold voltage of each sub-pixel when the display apparatus performs a power-off operation. Determining the data voltage required by each sub-pixel includes: determining the data voltage after the display apparatus performs the power-off operation and before the display apparatus performs a power-on operation.

In some embodiments, each sub-pixel includes: a switching transistor, a driving transistor and a sensing transistor. Acquiring the threshold voltage of each sub-pixel includes: acquiring a threshold voltage of the driving transistor through the sensing transistor.

In another aspect, an image display structure is provided. The image display structure includes: a memory, a receiver and a processor. The memory has stored thereon a correspondence table. The correspondence table includes at least one adjustment interval, an adjustment interval includes a first threshold voltage endpoint value and a second threshold voltage endpoint value, and the first threshold voltage endpoint value is less than the second threshold voltage endpoint value. In the adjustment interval, the compensation voltage is a constant value. The receiver is configured to be electrically connected to a plurality of sub-pixels in a display apparatus, and is further configured to acquire a threshold voltage of each sub-pixel. The processor is electrically connected to the memory and the receiver, and is configured to: determine an adjustment interval in which the acquired threshold voltage is located according to the correspondence table; acquire a compensation voltage corresponding to the acquired threshold voltage according to the correspondence table and the determined adjustment interval; and then determine, in a case where the display apparatus is to display a black image, a data voltage required by each sub-pixel according to the acquired threshold voltage and the acquired compensation voltage.

In some embodiments, the plurality of sub-pixels include a red sub-pixel, a green sub-pixel and a blue sub-pixel. The correspondence table includes correspondence relationships between threshold voltages of sub-pixels of different colors and the compensation voltage. The processor is further configured to: determine a color displayed by each sub-pixel; determine a correspondence relationship corresponding to the color displayed by each sub-pixel; and determine the adjustment interval in which the acquired threshold voltage is located in the correspondence relationship according to the acquired threshold voltage.

In some embodiments, the correspondence table further includes correspondence relationships between aging degrees of the sub-pixels of different colors and the compensation voltage. The processor is configured to: after the color displayed by each sub-pixel is determined, determine an aging degree of each sub-pixel; and acquire a compensation voltage corresponding to the aging degree according to the correspondence relationship and the aging degree. The processor is further configured to: determine the data voltage required by each sub-pixel according to the acquired threshold voltage, the compensation voltage corresponding to the acquired threshold voltage, and a threshold voltage corresponding to the aging degree.

In yet another aspect, a display apparatus is provided. The display apparatus includes: a display substrate, the image display structure as described in any one of the above embodiments, a timing controller electrically connected to the processor in the image display structure, and a source driver electrically connected to the timing controller. The display substrate includes a plurality of sub-pixels. The timing controller is configured to receive a data voltage determined by the processor and generate a source control signal according to the data voltage. The source driver is configured to generate a signal corresponding to the data voltage according to the source control signal.

In some embodiments, the display apparatus further includes: a main board electrically connected to the display substrate. The image display structure is arranged in the main board.

In yet another aspect, a non-transitory computer-readable storage medium is provided. The computer-readable storage medium has stored thereon computer program instructions that, when running, cause a computer to execute the image display method as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, and actual processes of methods involved in the embodiments of the present disclosure.

DETAILED DESCRIPTION

Figure 1:
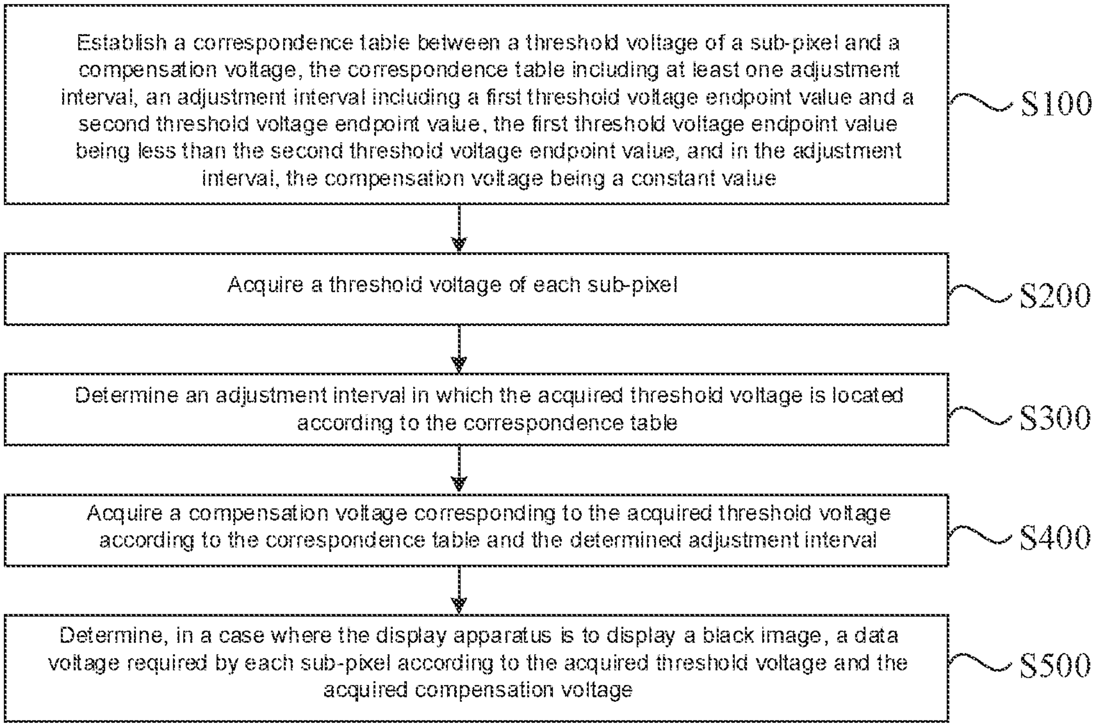
FIG. 1 is a flowchart of an image display method, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as open and inclusive, i.e., “including, but not limited to”. In the description of the specification, the terms such as “one embodiment,” “some embodiments,” “exemplary embodiments,” “an example,” “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as “first” and “second” are only used for descriptive purposes, and are not to be construed as indicating or implying the relative importance or implicitly indicating the number of indicated technical features. Thus, a feature defined with “first” or “second” may explicitly or implicitly include one or more of the features. In the description of the embodiments of the present disclosure, “a/the plurality of” means two or more unless otherwise specified.

In the description of some embodiments, the term “connected” and its derivatives may be used. For example, the term “connected” may be used in the description of some embodiments to indicate that two or more components are in direct physical or electrical contact with each other. The embodiments disclosed herein are not necessarily limited to the content herein.

The phrase “A and/or B” includes the following three combinations: only A, only B, and a combination of A and B.

As used herein, the term “if”, depending on the context, is optionally construed as “When” or “in a case where” or “in response to determining that” or “in response to detecting”. Similarly, depending on the context, the phrase “if it is determined” or “if [a stated condition or event] is detected” is optionally construed as “in a case where it is determined” or “in response to determining” or “in a case where [the stated condition or event] is detected” or “in response to detecting [the stated condition or event]”.

The phrase “applicable to” or “configured to” as used herein indicates an open and inclusive expression, which does not exclude devices that are applicable to or configured to execute additional tasks or steps.

Additionally, the phrase “based on” as used herein is meant to be open and inclusive, since a process, a step, a calculation or other action that is “based on” one or more of the stated conditions or values may, in practice, be based on additional conditions or values beyond those stated.

As used herein, the terms such as “about”, “approximately” or “substantially” as used herein include a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has feature of being curved. Therefore, the regions shown in the accompanying drawings are schematic in nature, and their shapes are not intended to show actual shapes of the regions in a device, and are not intended to limit the scope of the exemplary embodiments.

The transistors used in the circuits in the embodiments of the present disclosure may be thin film transistors, field effect transistors (e.g., oxide thin film transistors) or other switching devices with the same characteristics. In the embodiments of the present disclosure, thin film transistors are used as an example for illustration.

In the transistors adopted in the circuits provided by the embodiments of the present disclosure, the control electrode of the transistor is the gate of the transistor, the first electrode of the transistor is one of the source and the drain of the transistor, and the second electrode of the transistor is another of the source and the drain of the transistor. Since the source and the drain of the transistor may be symmetrical in structure, the source and the drain may be structurally indistinguishable. That is, the first electrode and the second electrode of the transistor provided in the embodiments of the embodiments of the present disclosure may be indistinguishable in structure. For example, in a case where the transistor is a P-type transistor, the first electrode of the transistor is the source and the second electrode of the transistor is the drain. For example, in a case where the transistor is an N-type transistor, the first electrode of the transistor is the drain, and the second electrode of the transistor is the source.

In the circuit provided by the embodiments of the present disclosure, the nodes do not represent actually existing components, but junctions of relevant electrical connections in the circuit diagram. That is to say, the nodes are nodes equivalent to the junctions of relevant electrical connections in the circuit diagram.

Hereinafter, the circuits provided in the embodiments of the present disclosure will be described by taking an example where the transistors are all N-type transistors.

Figure 11:
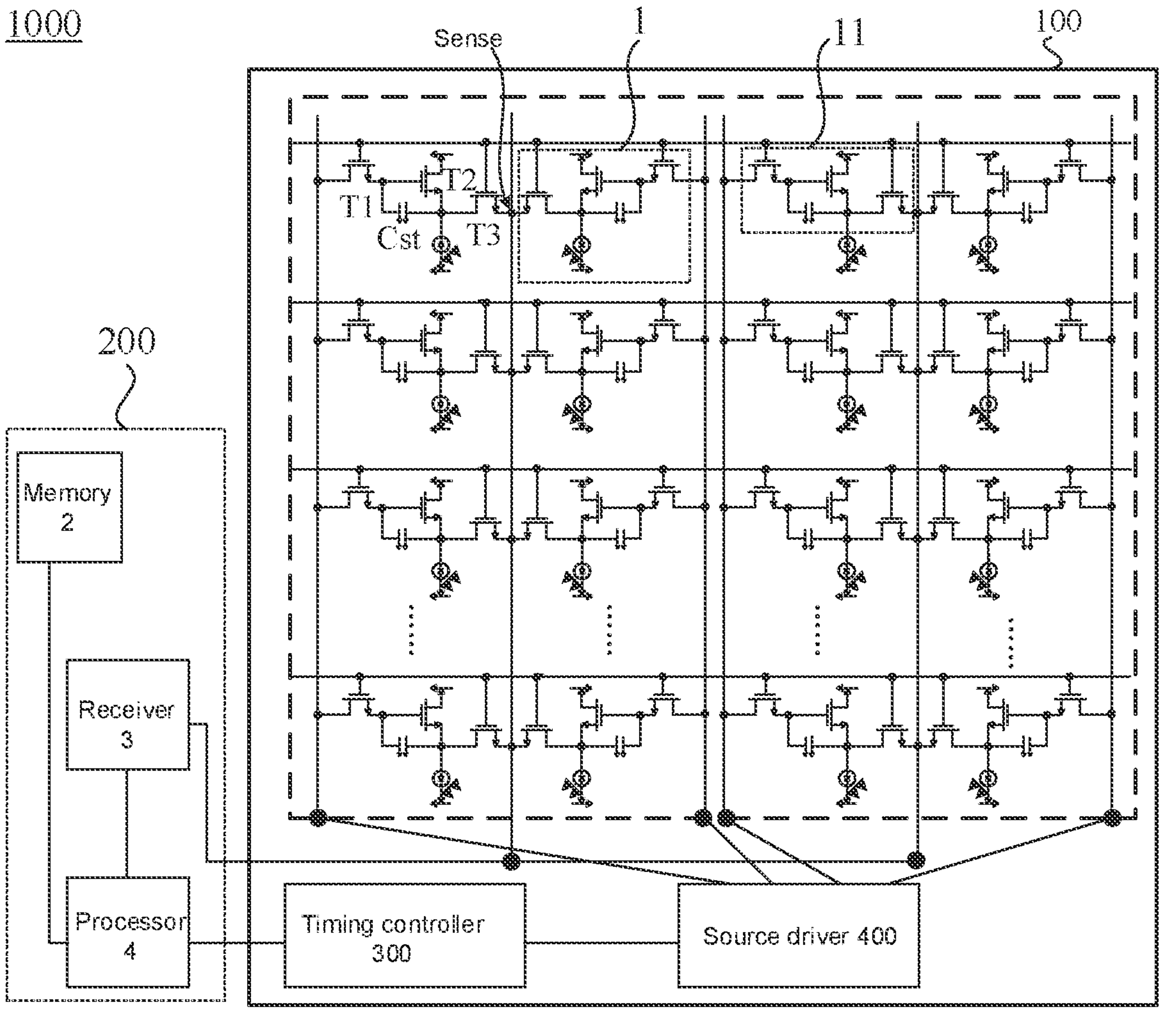
FIG. 11 is a structural diagram of a display apparatus, in accordance with some embodiments of the present disclosure.
Figure 12:
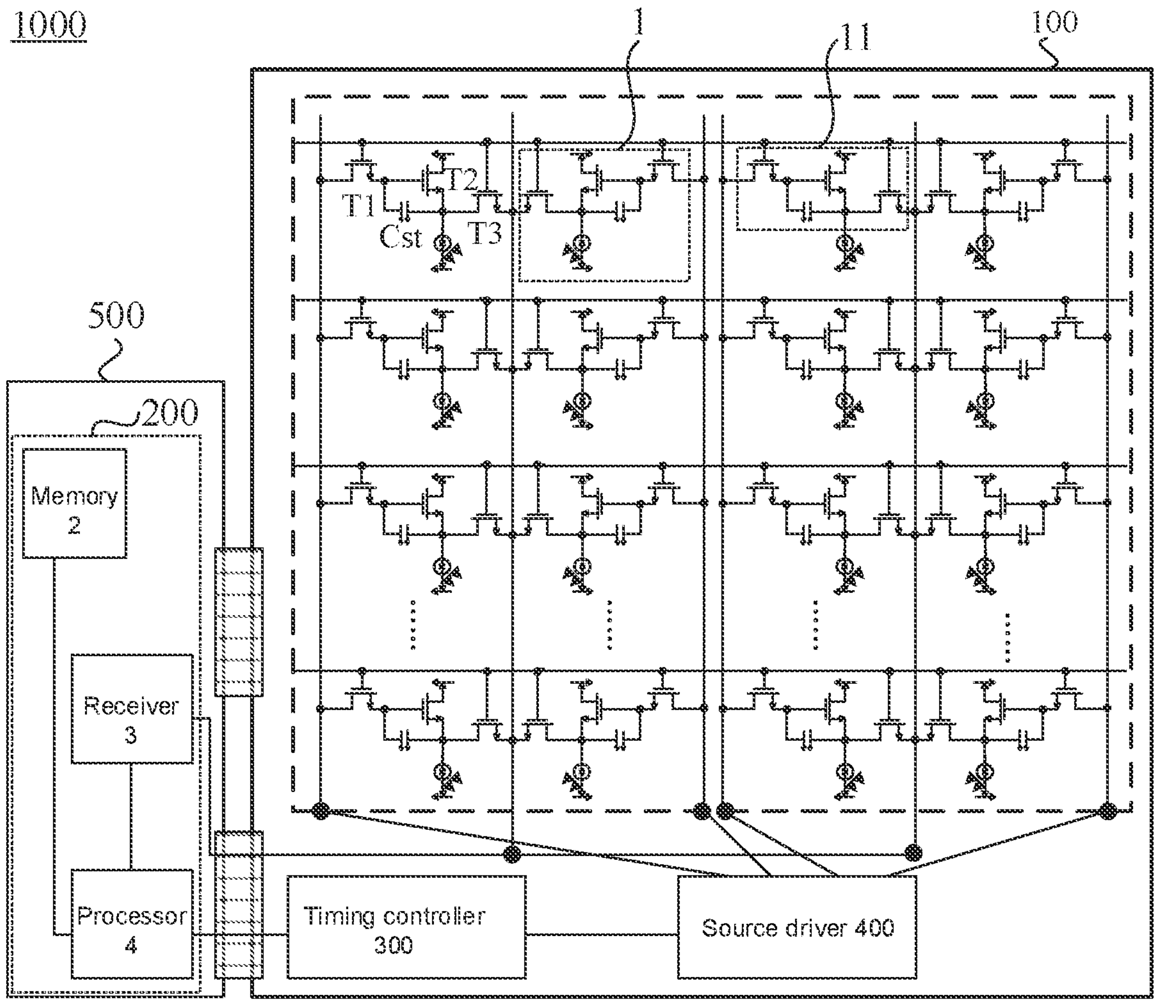
FIG. 12 is a structural diagram of another display apparatus, in accordance with some embodiments of the present disclosure.

As shown in FIGS. 11 and 12, some embodiments of the present disclosure provide a display apparatus 1000.

For example, the display apparatus 1000 may be a monitor, a television, a digital camera, a mobile phone, a tablet computer, or any other product or component having a display function.

In some embodiments, as shown in FIGS. 11 and 12, the display apparatus 1000 includes a display substrate 100.

In some examples, as shown in FIGS. 11 and 12, the display substrate 100 includes a plurality of sub-pixels 1. For example, the plurality of sub-pixels 1 may be arranged in an array.

Figure 13:
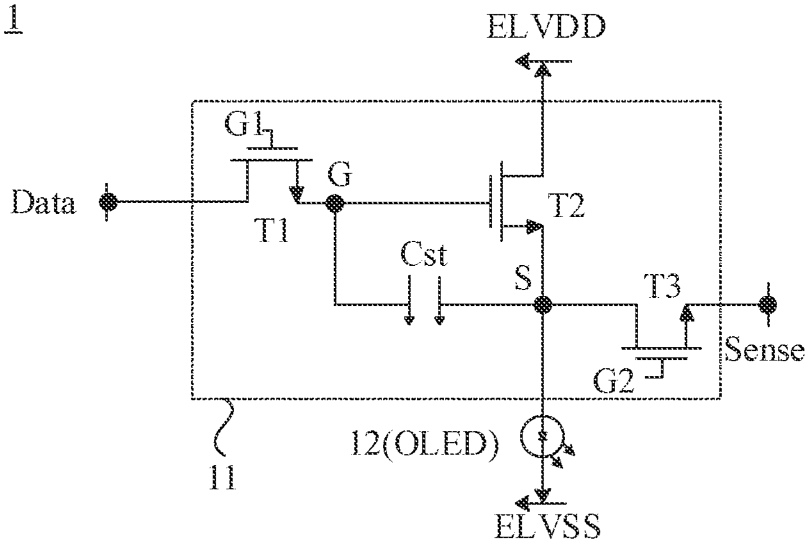
FIG. 13 is a structural diagram of a sub-pixel, in accordance with some embodiments of the present disclosure.

In some examples, as shown in FIG. 13, each sub-pixel 1 may include a pixel driving circuit 11 and a light-emitting device 12 electrically connected to the pixel driving circuit 11. The pixel driving circuit 11 may provide a driving signal to the light-emitting device 12, so as to control a light-emitting state of the light-emitting device 12.

For example, the driving signal provided by the pixel driving circuit 11 may control whether the light-emitting device 12 emits light or not, or may control the light-emitting luminance of the light-emitting device 12.

For example, the light-emitting device 12 may be a current-mode light-emitting diode. For example, the current-mode light-emitting diode may be a micro light-emitting diode (Micro LED), a mini light-emitting diode (Mini LED), an organic light-emitting diode (OLED), or a quantum dot light-emitting diode (QLED).

A structure of the pixel driving circuit 11 may vary, which may be determined according to actual needs. For example, the pixel driving circuit 11 may have a structure of "3T1C", "6T1C", "7T1C", "6T2C", or "7T2C". Herein, "T" represents a transistor, the number preceding "T" represents the number of transistors, "C" represents a storage capacitor, and the number preceding "C" represents the number of storage capacitors.

In a working process of the display apparatus 1000, a stability of the transistors and the light-emitting device 12 in the pixel driving circuit 11 may decrease (e.g., due to threshold voltage shift in a driving transistor or aging of the light-emitting device 12), which may affect a display effect of the display apparatus 1000. As a result, the sub-pixel 1 needs to be compensated.

A manner in which the sub-pixel 1 is compensated may vary, which may be determined according to actual needs. For example, a pixel compensation circuit may be provided in the sub-pixel 1, so as to compensate the sub-pixel 1 internally by using the pixel compensation circuit. For another example, a transistor inside the sub-pixel 1 may be used to sense the driving transistor or the light-emitting device 12, and the sensed data may be transmitted to an external sensing circuit, so as to use the external sensing circuit to calculate a driving voltage value for the compensation and send it back, thereby achieving external compensation of the sub-pixel 1.

In the embodiments of the present disclosure, the structure and a working process of the sub-pixel 1 will be schematically described below by taking an example where the pixel driving circuit 11 has a "3T1C" structure and the external compensation manner (sensing the driving transistor) is adopted.

For example, as shown in FIG. 13, the pixel driving circuit 11 includes: a switching transistor T1, a driving transistor T2, a sensing transistor T3 and a storage capacitor Cst.

For example, as shown in FIG. 13, a control electrode of the switching transistor T1 is electrically connected to a first gate signal terminal G1, a first electrode of the switching transistor T1 is electrically connected to a data signal terminal Data, and a second electrode of the switching transistor T1 is electrically connected to a first node G. The switching transistor T1 is configured to transmit a data signal received at the data signal terminal Data to the first node G in response to a first gate signal received at the first gate signal terminal G1.

The data signal includes, for example, a detection data signal and a display data signal. The detection data signal is used in a blanking period and the display data signal is used in a display period. As for the display period and the blanking period, reference may be made to the description of the following embodiments, and details will not be provided here.

For example, as shown in FIG. 13, a control electrode of the driving transistor T2 is electrically connected to the first node G, a first electrode of the driving transistor T2 is electrically connected to a first voltage signal terminal ELVDD, and a second electrode of the driving transistor T2 is electrically connected to a second node S. The driving transistor T2 is configured to: be turned on under control of a voltage of the first node G; generate a driving signal according to the voltage of the first node G and a first voltage signal received at the first voltage signal terminal ELVDD; and transmit the driving signal to the second node S.

For example, as shown in FIG. 13, a first terminal of the storage capacitor Cst is electrically connected to the first node G, and a second terminal of the storage capacitor Cst is electrically connected to the second node S. The switching transistor T1 simultaneously charges the storage capacitor Cst in a process of charging the first node G.

For example, as shown in FIG. 13, an anode of the light-emitting device 12 is electrically connected to the second node S, and a cathode of the light-emitting device 12 is electrically connected to a second voltage signal terminal ELVSS. The light-emitting device 12 is configured to be driven by the driving signal to emit light.

For example, as shown in FIG. 13, a control electrode of the sensing transistor T3 is electrically connected to a second gate signal terminal G2, a first electrode of the sensing transistor T3 is electrically connected to the second node S, and a second electrode of the sensing transistor T3 is electrically connected to a sensing signal terminal Sense. The sensing transistor T3 is configured to detect electrical properties of the driving transistor T2 in response to a second gate signal received at the second gate signal terminal G2, so as to achieve external compensation. The electrical properties include, for example, a threshold voltage and/or carrier mobility of the driving transistor T2.

The sensing signal terminal Sense may provide a reset signal or acquire a sense signal. The reset signal is used for resetting the second node S in the display period, and the acquisition of the sense signal refers to acquiring the threshold voltage and/or the carrier mobility of the driving transistor T2 in the blanking period.

In the present example, a display phase of a frame may include, for example, a display period and a blanking period in sequence.

In the display period in the display phase of a frame, the working process of the sub-pixel 1 includes, for example: a reset period, a data writing period and a light-emitting period.

In the reset period, the first gate signal provided by the first gate signal terminal G1 is at a high level, and the data signal provided by the data signal terminal Data is at a low level. The second gate signal provided by the second gate signal terminal G2 is at a high level, and the reset signal provided by the sensing signal terminal Sense is at a low level. The switching transistor T1 is turned on under control of the first gate signal, receives the data signal, and transmits the data signal to the first node G to reset the first node G. The sensing transistor T3 is turned on under control of the second gate signal, receives the reset signal, and transmits the reset signal to the second node S to reset the second node S.

In the data writing period, the first gate signal provided by the first gate signal terminal G1 is at a high level, and the data signal (e.g., the display data signal) provided by the data signal terminal Data is at a high level. The switching transistor T1 is turned on under control of the first gate signal, receives the data signal, and transmits the data signal to the first node G while charging the storage capacitor Cst.

In the light-emitting period, the first gate signal provided by the first gate signal terminal G1 is at a low level, the second gate signal provided by the second gate signal terminal G2 is at a low level, and the first voltage signal provided by the first voltage signal terminal ELVDD is at a high level. The switching transistor T1 is turned off under control of the first gate signal, and the sensing transistor T3 is turned off under control of the second gate signal. The storage capacitor Cst starts to discharge, so that the voltage of the first node G remains at a high level. The driving transistor T2 is turned on under control of the voltage of the first node G, receives the first voltage signal, generates the driving signal (e.g., a current signal), transmits the driving signal to the second node S to drive the light-emitting device 12 to emit light.

For example, a formula for calculating the driving signal (e.g., the current signal) is: $I=K\times(Vgs-Vth)^2$. K is a fixed parameter, Vgs is a voltage difference between the first node G and the second node S, and Vth is the threshold voltage of the driving transistor T2.

In the blanking period in the display phase of a frame, the working process of the sub-pixel 1 may, for example, include a first period and a second period.

In the first period, the first gate signal provided by the first gate signal terminal G1 and the second gate signal provided by the second gate signal terminal G2 are both at a high level, and the data signal (e.g., the detection data signal) provided by the data signal terminal Data is at a high level. The switching transistor T1 is turned on under control of the first gate signal, receives the data signal, and transmits the data signal to the first node G to charge the first node G. The sensing transistor T3 is turned on under control of the second gate signal, receives the reset signal provided by the sensing signal terminal Sense, and transmits the reset signal to the second node S.

In the second period, the sensing signal terminal Sense is in a floating state. The driving transistor T2 is turned on under control of the voltage of the first node G, receives the first voltage signal provided by the first voltage signal terminal ELVDD, and transmits the first voltage signal to the second node S to charge the second node S, so that a voltage of the second node S increases until the driving transistor T2 is turned off.

Since the sensing transistor T3 is in a turned-on state and the sensing signal terminal Sense is in a floating state, in the process of charging the second node S by the driving transistor T2, the sensing signal terminal Sense is also charged. By sampling a voltage of the sensing signal terminal Sense (i.e., by acquiring the sense signal), it may be possible to calculate the threshold voltage Vth of the driving transistor T2 (the threshold voltage Vth of the driving transistor T2 is equal to the voltage difference Vgs between the first node G and the second node S) and/or the carrier mobility of the driving transistor T2 according to a relationship between the voltage of the sensing signal terminal Sense and the level of the data signal.

Here, in a display process of the display apparatus 1000, for example, the carrier mobility of the driving transistor T2 is calculated after the blanking period of the display phase of each frame. In a power-off process of the display apparatus 1000, for example, the threshold voltage Vth of the driving transistor T2 is calculated.

The high level and the low level in the embodiments of the present disclosure are relative values; thus, the high level is not limited to be a level greater than or equal to 0 V, and the low level is not limited to be a level less than or equal to 0 V.

It will be noted that, in the display process of the display apparatus 1000, a black image is displayed in a display phase of a certain frame. That is, in a display period of the display phase of the frame, the light-emitting device 12 does not emit light and the display luminance is 0. In this case, in order to ensure that the light-emitting device 12 remains in a non-light-emitting state in the light-emitting period, it needs to be ensured that a voltage difference (i.e., the voltage difference Vgs) between the data signal written to the first node G through the switching transistor T1 in the data writing period and the reset signal written to the second node S through the sensing transistor T3 in the reset period is less than the threshold voltage Vth of the driving transistor T2. In this way, it may be ensured that the driving transistor T2 remains in a turned-off state in the light-emitting period, so that a value of the driving signal is 0.

It will be understood that, an initial value of the threshold voltage Vth of the driving transistor is typically between −1 V and 0 V. The driving transistor is susceptible to temperature and/or light, resulting in a negative drift in its threshold voltage. In the process in which the display apparatus needs to display a black image, in order to ensure that the driving signal I is equal to 0 (I=0), that is, in order to ensure that the driving transistor is not turned on, the voltage difference Vgs needs to be reduced. A magnitude of the voltage difference Vgs is related to a voltage value (hereinafter simply referred to as a data voltage) Vg of the data signal written to the first node through the switching transistor in the data writing period and a voltage value Vs of the reset signal written to the second node through the sensing transistor in the reset period.

In the related art, a data voltage is generally set to 0 V, and a voltage value Vs of a reset signal written to a second node through a sensing transistor in a reset period is set to 1 V. In this case, the voltage difference Vgs is equal to −1 V (Vgs=1V), and the voltage difference Vgs is less than the threshold voltage Vth (Vgs<Vth), which may meet the conditions for displaying a black image. However, the driving transistor is affected by the negative bias temperature stress (NBTS), which causes the threshold voltage of the driving transistor to continuously drift negatively. Therefore, in order to avoid a situation that it is difficult to satisfy the condition that the voltage difference Vgs is less than the threshold voltage Vth (Vgs<Vth) after the threshold voltage of the driving transistor has drifted negatively, the voltage value Vs of the reset signal written to the second node through the sensing transistor in the reset period is set to be rather high (e.g., the voltage value Vs of the reset signal is set to 2.5 V) before the display apparatus leaves the factory, so as to ensure that the voltage difference Vgs (i.e., −2.5 V) is less than the threshold voltage Vth (Vgs<Vth) in the light-emitting period, that is, to ensure that the driving transistor is not turned on. However, the higher the voltage of the second node is set to be, the larger the NBTS generated by the driving transistor is, and in turn, the more quickly the threshold voltage of the driving transistor drifts negatively under the influence of the NBTS.

Based on this, some embodiments of the present disclosure provide an image display method. The image display method is applied to the display apparatus 1000 described above. As for the display apparatus 1000, reference may be made to the description of the related embodiments herein, and details will not be repeated here.

In some examples, as shown in FIG. 1, the image display method includes S100 to S500.

Figure 5:
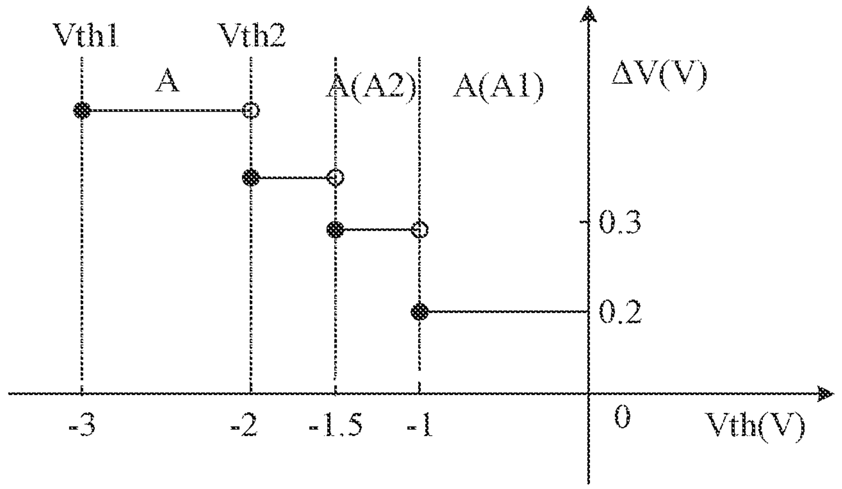
FIG. 5 is a correspondence table, in accordance with some embodiments of the present disclosure.

In S100, as shown in FIG. 5, a correspondence table between a threshold voltage Vth of a sub-pixel 1 and a compensation voltage ΔV is established. The correspondence table includes at least one adjustment interval A. The adjustment interval A includes a first threshold voltage endpoint value Vth1 and a second threshold voltage endpoint value Vth2, and the first threshold voltage endpoint value Vth1 is less than the second threshold voltage endpoint value Vth2. In the adjustment interval A, the compensation voltage ΔV is a constant value.

For example, the correspondence table may be established and stored in the display apparatus 1000 before the display apparatus 1000 leaves the factory. Based on this, the sub-pixel 1 in the correspondence table is a general sub-pixel 1, which is different from a specific sub-pixel 1 mentioned below. The threshold voltage Vth of the above-mentioned sub-pixel 1 means, for example, a threshold voltage Vth of a driving transistor T2 in the sub-pixel 1.

For example, the number of adjustment intervals A included in the correspondence table may be one or more.

Optionally, in a case where the correspondence table includes one adjustment interval A, the second threshold voltage endpoint value Vth2 is, for example, an initial value of the threshold voltage of the driving transistor T2.

Optionally, in a case where the correspondence table includes a plurality of adjustment intervals A, a largest second threshold voltage endpoint value Vth2 in a plurality of second threshold voltage endpoint values Vth2 is, for example, the initial value of the threshold voltage of the driving transistor T2.

For example, the initial value of the threshold voltage of the driving transistor T2 is any value in a range of −1 V to 0 V (including endpoints).

In the embodiments of the present disclosure, the image display method is schematically described below by taking an example where the initial value of the threshold voltage of the driving transistor T2 is 0 V.

It will be noted that, each adjustment interval A includes a smaller first threshold voltage endpoint value Vth1 and a larger second threshold voltage endpoint value Vth2, and in the adjustment interval A, the compensation voltage ΔV is a constant value.

Since each adjustment interval A corresponds to a single compensation voltage ΔV, the first threshold voltage endpoint value Vth1 and/or the second threshold voltage endpoint value Vth2 of a certain adjustment interval A may be each an actual value or a virtual value.

For example, as shown in FIG. 5, in two adjacent adjustment intervals A, a first threshold voltage endpoint value Vth1 of a first adjustment interval A1 is −1 V, and a second threshold voltage endpoint value Vth2 of a second adjustment interval A2 is −1 V. The "−1 V" may belong to the first adjustment interval A1; in this case, the first threshold voltage endpoint value Vth1 of the first adjustment interval A1 is an actual value, and the second threshold voltage endpoint value Vth2 of the second adjustment interval A2 is a virtual value. Alternatively, the "−1 V" may belong to the second adjustment interval A2; in this case, the first threshold voltage endpoint value Vth1 of the first adjustment interval A1 is a virtual value, and the second threshold voltage endpoint value Vth2 of the second adjustment interval A2 is an actual value. In FIG. 5, a solid circle indicates that a corresponding threshold voltage endpoint value is an actual value, and an empty circle indicates that a corresponding threshold voltage endpoint value is a virtual value.

In S200, a threshold voltage Vth of each sub-pixel 1 is acquired.

It will be understood that, in a case where the external compensation manner is adopted, in the pixel driving circuits 11 included in the sub-pixels 1, the pixel driving circuits 11 of different structures each include at least the switching transistor T1, the sensing transistor T3 and the driving transistor T2. Of course, the pixel driving circuit 11 may further include a light-emitting control transistor.

For example, in S200, acquiring the threshold voltage Vth of each sub-pixel 1 includes: acquiring the threshold voltage Vth of the driving transistor T2 through the sensing transistor T3 in each sub-pixel 1.

For example, in an example where the pixel driving circuit 11 has a 3T1C structure, as for a specific process for acquiring the threshold voltage Vth of the sub-pixel 1, reference may be made to the foregoing description of the blanking period in the display phase of a frame, and details not be repeated here.

Optionally, the acquired threshold voltage Vth is, for example, 0 V.

In S300, an adjustment interval A in which the acquired threshold voltage Vth is located is determined according to the correspondence table.

For example, after the threshold voltage Vth of each sub-pixel 1 is acquired, the threshold voltage Vth may be compared with the first threshold voltage endpoint value Vth1 and/or the second threshold voltage endpoint value Vth2 of each adjustment interval A in the correspondence table, and then, the adjustment interval A in which the acquired threshold voltage Vth is located is determined according to the comparison result.

Optionally, in a case where the correspondence table includes a plurality of adjustment intervals, the comparison between the acquired threshold voltage Vth and the threshold voltage endpoint values of each adjustment interval A may start from a first adjustment interval A (i.e., the adjustment interval A having the largest second threshold voltage endpoint value Vth2) of the plurality of adjustment intervals A.

For example, it is compared whether the acquired threshold voltage Vth is greater than the second threshold voltage endpoint value Vth2 of the first adjustment interval A.

If yes, the threshold voltage does not belong to the adjustment interval A.

If no, it is compared whether the acquired threshold voltage Vth is greater than a first threshold voltage endpoint value Vth1 of the first adjustment interval A. If yes, it is determined that the acquired threshold voltage Vth belongs to the first adjustment interval A. If no, the acquired threshold voltage Vth is compared with threshold voltage endpoint values of an adjacent adjustment interval A, until the adjustment interval A in which the acquired threshold voltage Vth is located is determined.

For example, the acquired threshold voltage Vth is 0 V. The value 0 V is compared with the second threshold voltage endpoint value Vth2 (i.e., 0 V) of the first adjustment interval A (−1 V to 0 V). It can be seen that, the acquired threshold voltage Vth is not greater than the second threshold voltage endpoint value Vth2. Then, the acquired threshold voltage Vth is compared with the first threshold voltage endpoint value Vth1 (i.e., −1 V) of the first adjustment interval A. It can be seen that, the acquired threshold voltage Vth is greater than the first threshold voltage endpoint value Vth1. Therefore, it is determined that the adjustment interval A corresponding to the acquired threshold voltage Vth (i.e. 0 V) in the correspondence table is the first adjustment interval A.

In S400, a compensation voltage ΔV corresponding to the acquired threshold voltage Vth is acquired according to the correspondence table and the determined adjustment interval A.

It will be understood that, each adjustment interval A corresponds to a compensation voltage ΔV. After the adjustment interval A corresponding to the threshold voltage Vth is determined, the corresponding compensation voltage ΔV is acquired.

For example, the adjustment interval A corresponding to the acquired threshold voltage Vth (i.e., 0 V) is the first adjustment interval A (i.e., −1 V to 0 V). A compensation voltage ΔV corresponding to the first adjustment interval A is 0.2 V. Therefore, it is determined that the compensation voltage ΔV corresponding to the acquired threshold voltage Vth is 0.2 V.

In S500, in a case where the display apparatus 1000 is to display a black image, a data voltage Vg required by each sub-pixel 1 is determined according the acquired threshold voltage Vth and the acquired compensation voltage ΔV.

It will be noted that, the data voltage Vg required by the sub-pixel 1 is a voltage value of the data signal written to the first node G through the switching transistor T1 in the data writing period in the display period of a frame.

For example, the data voltage Vg required by the sub-pixel 1 satisfies the following relationship: $Vg=Vs+Vth-\Delta V$.

For example, when the display apparatus 1000 displays a black image, each sub-pixels 1 does not emit light, and it needs to be ensured that the driving signal I is equal to 0 (1=0). That is to say, in the pixel driving circuit 11 of each sub-pixel 1, the voltage value Vs of the reset signal written to the second node S in the reset period, the data voltage Vg written to the first node G in the data writing period, and the threshold voltage Vth of the driving transistor T2 need to satisfy the following relationship: $Vg-Vs-Vth<0$. In this case, the driving transistor T2 may be in a turned-off state, and the light-emitting device 12 does not emit light.

For example, the voltage value Vs of the reset signal written to the second node S in the reset period is 2.5 V, the acquired threshold voltage Vth is 0 V, and the compensation voltage ΔV corresponding to the threshold voltage Vth is 0.2 V. According to the relationship $Vg=Vs+Vth-\Delta V$, it can be obtained that the data voltage Vg written to the first node G in the data writing period is 2.3 V. In this case, the voltage difference Vgs between the first node G and the second node S is 2.3 V−2.5 V=−0.2 V. However, in the related art, the voltage difference Vgs is −2.5 V.

It can be seen from the above that, the voltage difference Vgs between the first node G and the second node S is not only less than 0, but also has a small value (i.e., a small absolute value), which is much less than the value (i.e., also an absolute value) of Vgs in the related art. In this way, it may not only be possible to ensure that the sub-pixel 1 does not emit light when the display apparatus 1000 displays the black image and prevent the black image from being bright, but it may also be possible to greatly reduce the voltage difference Vgs between the first node G and the second node S, reduce the NBTS, and thereby greatly slow down a negative drift caused by the NBTS.

In the image display method provided by some embodiments of the present disclosure, by establishing the correspondence table between the threshold voltage Vth of the sub-pixel 1 and the compensation voltage ΔV, after the threshold voltage Vth of each sub-pixel 1 is acquired, it may be possible to determine the adjustment interval A in which the acquired threshold voltage Vth is located, and then acquire the corresponding compensation voltage ΔV according to the correspondence table and the determined adjustment interval A. After that, in a case where the display apparatus 1000 needs to display a black image, it may be possible to determine the data voltage Vg required by each sub-pixel 1 according to the acquired threshold voltage Vth and the acquired compensation voltage ΔV. By adjusting a manner in which the data voltage Vg is acquired, the embodiments of the present disclosure may adjust a magnitude of the data voltage Vg required by the sub-pixel 1, so that the magnitude of the data voltage Vg is closer to the voltage Vs of the second node S. Therefore, it may not only be possible to satisfy the condition that $Vg-Vs-Vth<0$, but it may also be possible to reduce the voltage difference between the data voltage Vg and the voltage Vs of the second node S. In this way, it may not only be possible to ensure that the sub-pixel 1 does not emit light when the display apparatus 1000 displays the black image and prevent the black image from being bright, but it may also be possible to greatly reduce the effect of NBTS caused by setting the voltage Vs of the second node S too high, reduce the negative drift rate of the driving transistor T2 in the sub-pixel 1 to a certain extent, improve the stability of the driving transistor T2 of the sub-pixel 1, and improve the display quality of the display apparatus 1000.

It will be understood that, in the display apparatus 1000, threshold voltages Vth of driving transistors T2 of different sub-pixels 1 may be different. In a case where the display apparatus 1000 is to display the black image, the data voltage Vg required by the sub-pixel 1 satisfies the following relationship: $Vg=Vs+Vth-AV$. As such, the data voltage Vg required by each sub-pixel 1 in a column of sub-pixels 1 is different.

Figure 6:
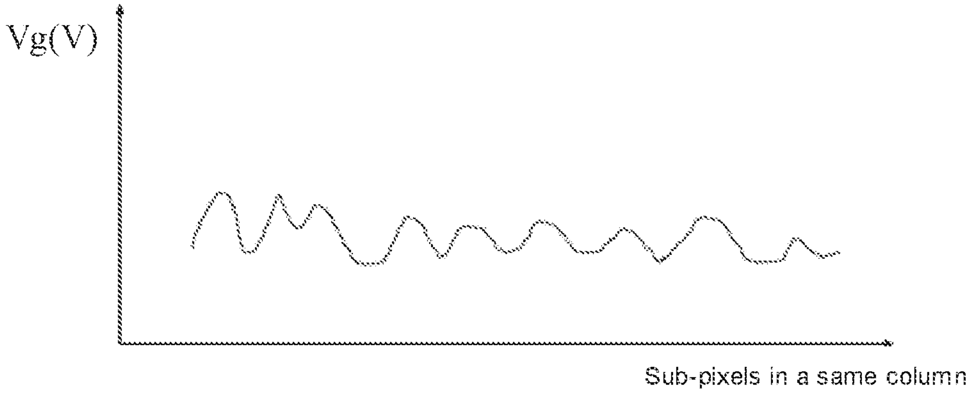
FIG. 6 is a diagram illustrating a relationship between a same column of sub-pixels and a data voltage, in accordance with some embodiments of the present disclosure.

For example, FIG. 6 is a schematic diagram of data voltages Vg required by a certain column of sub-pixels 1 in the display apparatus 1000. Since the threshold voltages Vth of the driving transistors T2 of different sub-pixels 1 may be different, the data voltage Vg required by each sub-pixel 1 in the column of sub-pixels 1 is different. Without considering an effect of the compensation voltage ΔV on the data voltage Vg, the data voltage Vg required by each sub-pixel 1 may change, for example, as the threshold voltage Vth changes.

In this way, in a case where the display apparatus 1000 is to display the black image, it may be possible to reduce the voltage difference between the data voltage Vg and the voltage Vs of the second node S in different sub-pixels 1. Therefore, it may be possible to reduce the negative drift rates of the driving transistors T2 in different sub-pixels land prevent the provision of the same data voltage Vg from causing a large voltage difference between the data voltage Vg and the voltage Vs of the second node S in a part of sub-pixels 1 and causing a large negative drift rate of the driving transistor T2 in the part of sub-pixels 1.

Figure 7:
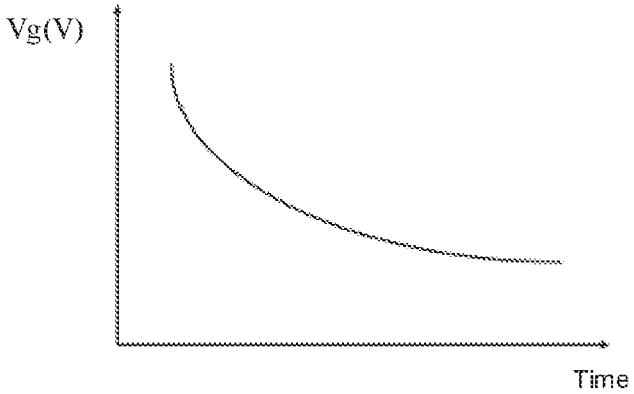
FIG. 7 is a diagram illustrating a relationship between a data voltage required by a same sub-pixel and time, in accordance with some embodiments of the present disclosure.

In addition, for a same sub-pixel 1, as shown in FIG. 7, over time, the threshold voltage Vth gradually drifts negatively, and accordingly, the data voltage Vg required by the sub-pixel 1 gradually decreases.

It will be understood that, in the correspondence table between the threshold voltage Vth of the sub-pixel 1 and the compensation voltage ΔV, the number of the adjustment intervals A may be one or more.

In some examples, the correspondence table includes one adjustment interval A. In this case, as the threshold voltage Vth of the driving transistor T2 in the sub pixel 1 gradually drifts negatively (that is, the threshold voltage Vth gradually decreases), the compensation voltage ΔV may remain the same.

In some other examples, the correspondence table includes a plurality of adjustment intervals A. In this case, the compensation voltage ΔV may change as the threshold voltage Vth of the driving transistor T2 in the sub-pixel 1 gradually drifts negatively. The changing trend of the compensation voltage ΔV may be set according to actual needs.

Optionally, as shown in FIG. 5, in a case where the correspondence table includes a plurality of adjustment intervals A, two adjacent adjustment intervals A are a first adjustment interval A1 and a second adjustment interval A2, respectively. An average value of threshold voltages Vth corresponding to the first adjustment interval A1 is less than an average value of threshold voltages Vth corresponding to the second adjustment interval A2. A compensation voltage ΔV corresponding to the first adjustment interval A1 is less than a compensation voltage ΔV corresponding to the second adjustment interval A2.

That is to say, as the threshold voltage Vth decreases, the compensation voltage ΔV may change in the following way: decrease in a stepwise manner. Since the threshold voltage Vth of the driving transistor T2 gradually drifts negatively over time, it may be considered that the compensation voltage ΔV changes in the following way over time: decreases in a stepwise manner.

For example, as shown in FIG. 5, in a certain adjustment interval A (i.e., the first adjustment interval A1) of the correspondence table, the second threshold voltage endpoint value Vth2 is 0 V, and the first threshold voltage endpoint value Vth1 is −1 V. Accordingly, in the adjustment interval A, the compensation voltage ΔV is 0.2 V.

For another example, in a certain adjustment interval A of the correspondence table, the second threshold voltage endpoint value Vth2 is −1 V, and the first threshold voltage endpoint value Vth1 is −1.5 V. Accordingly, in the adjustment interval A, the compensation voltage ΔV is 0.1 V.

In a case where the display apparatus 1000 is to display the black image, the data voltage Vg required by the sub-pixel 1 satisfies the following relationship: $Vg=Vs+Vth-\Delta V$. Therefore, by setting that the compensation voltage ΔV changes in the above manner, the requirement for displaying the black image may be satisfied, and it may also be ensured that the data voltage Vg will not be too small as the threshold voltage Vth decreases. As a result, the data voltage Vg is even closer to the voltage Vs of the second node S, which greatly reduces the effect of NBTS caused by setting the voltage Vs of the second node S too high, and slows down the negative drift of the driving transistor T2 in the sub-pixel 1.

Since the refresh rate of the sub-pixel 1 is high, in the display process of the display apparatus 1000, the blanking period in the display phase of each frame is very short. Therefore, the carrier mobility of the driving transistor T2 may be calculated in the blanking period, and the threshold voltage Vth of the driving transistor T2 may be calculated in the power-off process of the display apparatus 1000.

Based on this, in some embodiments, acquiring the threshold voltage Vth of each sub-pixel 1 (S200) includes: acquiring the threshold voltage Vth of each sub-pixel 1 when the display apparatus 1000 performs a power-off operation.

During the process when the display apparatus 1000 performs the power-off operation, a sufficient charging time may be provided for the pixel driving circuit 11 of the sub-pixel 1, so that the threshold voltage Vth of the driving transistor T2 may be calculated.

In some examples, determining the data voltage Vg required by each sub-pixel 1 (S500) includes: in a case where the display apparatus 1000 is to display the black image, determining the data voltage Vg according to the acquired threshold voltage Vth and the acquired compensation voltage ΔV after the display apparatus 1000 performs the power-off operation and before the display apparatus 1000 performs a power-on operation.

That is to say, before the display apparatus 1000 performs the power-off operation, the threshold voltage Vth of the sub-pixel 1 is generally not acquired, and the threshold voltage Vth used in the process of performing threshold voltage compensation on the sub-pixel 1 is calculated before the display apparatus 1000 performs the power-on operation. When the display apparatus 1000 performs the next power-on operation and during the display process, the threshold voltage Vth used in the process of performing threshold voltage compensation on the sub-pixel 1 is generally not updated and remains unchanged; therefore, in this period, when the display apparatus 1000 displays the black image, the data voltage Vg may remain unchanged.

The compensation voltage ΔV is set in a way that there is a certain difference between the voltage difference Vgs and the threshold voltage Vth, so as to reserve a certain margin for the negative drift of the threshold voltage Vth of the sub-pixel 1. In this way, it may be possible to avoid a situation that a too large negative drift of the threshold voltage Vth of the pixel 1 causes Vgs to be greater than the threshold voltage Vth when the display apparatus 1000 performs the power-on operation and during the display process. As a result, it may be possible to ensure that the display apparatus 1000 may display the black image after performing the power-on operation and before performing each power-off operation each time, and that the voltage difference Vgs has a small absolute value. Therefore, the effect of NBTS may be reduced, and the negative drift rate of the driving transistor T2 in the sub-pixel 1 may be reduced.

In some embodiments, the plurality of sub-pixels 1 included in the display apparatus 1000 include sub-pixels of a plurality of colors.

Figure 8:
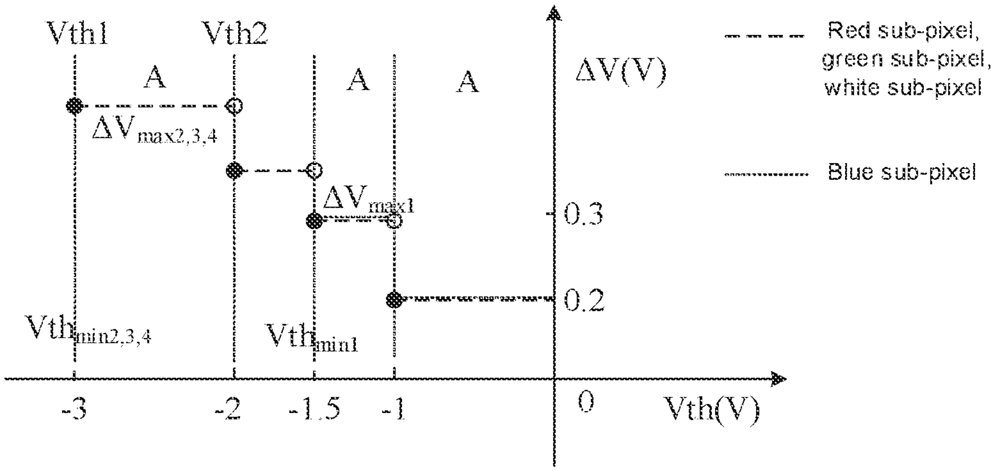
FIG. 8 is another correspondence table, in accordance with some embodiments of the present disclosure.

Based on this, as shown in FIG. 8, the correspondence table may include correspondence relationships between the threshold voltages Vth of the sub-pixels of different colors and the compensation voltage ΔV.

In some examples, the plurality of sub-pixels 1 include a red sub-pixel, a green sub-pixel, and a blue sub-pixel.

For example, the correspondence table includes a correspondence relationship between a threshold voltage Vth of a red sub-pixel and the compensation voltage ΔV, a correspondence relationship between a threshold voltage Vth of a green sub-pixel and the compensation voltage ΔV, and a correspondence relationship between a threshold voltage Vth of a blue sub-pixel and the compensation voltage ΔV. The correspondence relationships between the threshold voltages Vth of the sub-pixels 10 of different colors and the compensation voltage ΔV may, for example, be the same or different.

Figure 2:
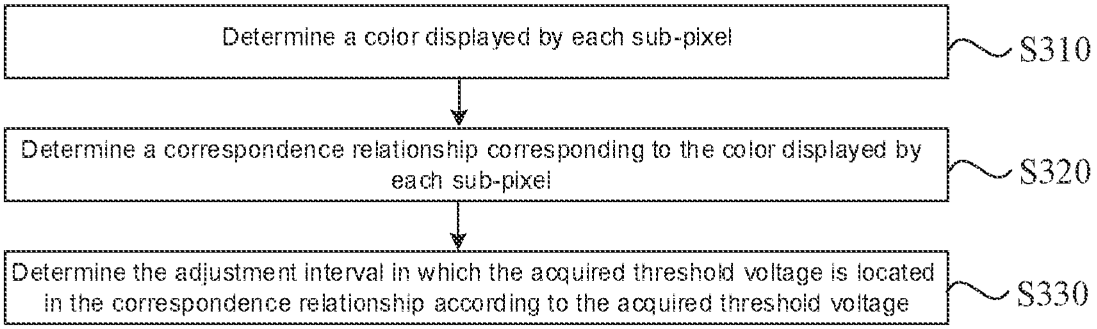
FIG. 2 is a flowchart of S300 in the flowchart shown in FIG. 1.

In some examples, as shown in FIG. 2, determining the adjustment interval A in which the acquired threshold voltage Vth is located (S300) includes S310 to S330.

In S310, a color displayed by each sub-pixel 1 is determined.

Here, the method for determining the color displayed by the sub-pixel 1 may vary, which may be selected according to actual needs.

For example, an optical detection method may be adopted to detect the light emitted by each sub-pixel 1, and the color displayed by each sub-pixel 1 may be confirmed by comparing the color of the light.

For example, the color displayed by the sub-pixel 1 may be determined according to an arrangement or coordinates of the sub-pixel 1.

For example, if the color displayed by the sub-pixel 1 is red, then the sub-pixel 1 is a red sub-pixel. If the color displayed by the sub-pixel 1 is green, then the sub-pixel 1 is a green sub-pixel. If the color displayed by the sub-pixel 1 is blue, then the sub-pixel 1 is a blue sub-pixel.

In S320, a correspondence relationship corresponding to the color displayed by each sub-pixel 1 is determined.

For example, after the color displayed by the sub-pixel 1 is determined, the correspondence relationship between the threshold voltage Vth of the color displayed by the sub-pixel 1 and the compensation voltage ΔV may be acquired by checking the correspondence table.

For example, it is determined that the color displayed by the sub-pixel 1 is red. Then, the correspondence relationship between the threshold voltage Vth of the red sub-pixel and the compensation voltage ΔV may be acquired by checking the correspondence table.

In S330, the adjustment interval A in which the acquired threshold voltage Vth is located in the correspondence relationship is determined according to the acquired threshold voltage Vth.

For example, it is determined that the color displayed by the sub-pixel 1 is red. By comparing the acquired threshold voltage Vth with a first threshold voltage endpoint value Vth1 and/or a second threshold voltage endpoint value Vth2 of each adjustment interval A in the correspondence relationship between the threshold voltage Vth of the red sub-pixel and the compensation voltage ΔV, it may be possible to determine the adjustment interval A in which the acquired threshold voltage Vth is located according to the comparison result.

In this example, as for the process of determining the adjustment interval A in which the acquired threshold voltage Vth is located in the correspondence relationship, reference may be made to the above description of S300, and details will not be repeated here.

For example, after the adjustment interval A in which the acquired threshold voltage Vth of the red sub-pixel is located in the correspondence relationship between the threshold voltage Vth of the red sub-pixel and the compensation voltage ΔV is determined, it may be possible to acquire the compensation voltage ΔV corresponding to the acquired threshold voltage Vth of the red sub-pixel according to the correspondence relationship and the adjustment interval A.

It will be noted that, the negative drift rates of the driving transistors T2 corresponding to sub-pixels of different colors are different. Therefore, the threshold voltages Vth of the driving transistors T2 of the sub-pixels of different colors acquired at a same time are different.

By setting the correspondence relationships in the correspondence table according to the colors of the sub-pixels, the correspondence relationships between the threshold voltages Vth of the sub-pixels of different colors and the compensation voltages ΔV may be acquired. In this way, in the process of determining the adjustment interval A in which the acquired threshold voltage is located, the adjustment interval A may be determined according to the color displayed by the sub-pixel 1, and in turn, a corresponding compensation voltage ΔV and a data voltage Vg required by the sub-pixel 1 may be determined in the correspondence relationship corresponding to the color displayed by the sub-pixel 1. Therefore, it may be possible to increase the precision and accuracy of the acquired compensation voltage ΔV and the determined data voltage Vg, and reduce the difference between the negative drift rates of the driving transistors T2 in different sub-pixels 1 while realizing the display of the black image.

In some embodiments, as shown in FIG. 8, the correspondence relationship corresponding to the blue sub-pixel includes a first minimum threshold voltage endpoint value Vthmin1, the correspondence relationship corresponding to the red sub-pixel includes a second minimum threshold voltage endpoint value Vthmin2, and the correspondence relationship corresponding to the green sub-pixel includes a third minimum threshold voltage endpoint value Vthmin3. The first minimum threshold voltage endpoint value Vthmin1 is greater than the second minimum threshold voltage endpoint value Vthmin2, and the first minimum threshold voltage endpoint value Vthmin1 is greater than the third minimum threshold voltage endpoint value Vthmin3.

It will be understood that, in the display process of the display apparatus 1000, different sub-pixels 1 will emit light. A part of the light is prone to be reflected by traces (e.g., lines included in the pixel driving circuit 11) in the display apparatus 1000 and is then incident on the driving transistor T2. According to research, the blue light emitted by the blue sub-pixels will affect the driving transistors T2 of the pixel driving circuits 11 in the red sub-pixels and the green sub-pixels, which causes the threshold voltages of the driving transistors T2 in the red sub-pixels and the green sub-pixels to drift negatively; however, the red light emitted by the red sub-pixels and the green light emitted by the green sub-pixels have substantially no effect on the driving transistors T2 of the pixel driving circuits 11 in all the sub-pixels 1, which substantially will not cause the threshold voltages of the driving transistors T2 in the sub-pixels 1 to drift negatively.

That is to say, a negative drift rate of the threshold voltage Vth of the driving transistor T2 in the blue sub-pixel is lower than a negative drift rate of the threshold voltage Vth of the driving transistor T2 in a sub-pixel of other colors. In a same time period, a degree to which the threshold voltage Vth of the driving transistor T2 in the blue sub-pixel drifts negatively is lower than a degree to which the threshold voltage Vth of the driving transistor T2 in the sub-pixel of other colors drifts negatively.

Therefore, in the correspondence relationships corresponding to the sub-pixels of different colors, the first minimum threshold voltage endpoint value Vthmin1 corresponding to the blue sub-pixel is not only greater than the second minimum threshold voltage endpoint value Vthmin2 corresponding to the red sub-pixel, but is also greater than the third minimum threshold voltage endpoint value Vthmin3 corresponding to the green sub-pixel.

The embodiments of the present disclosure does not limit a relationship between the magnitudes of the second minimum threshold voltage endpoint value Vthmin2 corresponding to the red sub-pixel and the third minimum threshold voltage endpoint value Vthmin3 corresponding to the green sub-pixel, which may be set according to actual situations.

In some examples, as shown in FIG. 8, the second minimum threshold voltage endpoint value Vthmin2 corresponding to the red sub-pixel and the third minimum threshold voltage endpoint value Vthmin3 corresponding to the green sub-pixel are substantially equal.

That is, the second minimum threshold voltage endpoint value Vthmin2 and the third minimum threshold voltage endpoint value Vthmin3 may be equal. Alternatively, there may be a small difference between the second minimum threshold voltage endpoint value Vthmin2 and the third minimum threshold voltage endpoint value Vthmin3 due to unavoidable factors such as temperature.

In some embodiments, as shown in FIG. 8, the correspondence relationship corresponding to the blue sub-pixel includes a first maximum compensation voltage value ΔVmax1, the correspondence relationship corresponding to the red sub-pixel includes a second maximum compensation voltage value ΔVmax2, and the correspondence relationship corresponding to the green sub-pixel includes a third maximum compensation voltage value ΔVmax 3. The first maximum compensation voltage value ΔVmax1 is less than the second maximum compensation voltage value ΔVmax 2, and the first maximum compensation voltage value ΔVmax1 is less than the third maximum compensation voltage value ΔVmax 3.

The negative drift rate of the threshold voltage Vth of the driving transistor T2 in the blue sub-pixel is lower than the negative drift rate of the threshold voltage Vth of the driving transistor T2 in the sub-pixel of other colors. Therefore, by setting the maximum compensation voltage values in the correspondence relationships, the first maximum compensation voltage value ΔVmax1 corresponding to the blue sub-pixel is less than a maximum compensation voltage value corresponding to the sub-pixel of other colors. In this way, it may be possible to increase the precision and accuracy of the acquired compensation voltages corresponding to the blue sub-pixel and the sub-pixel of other colors, increase the precision and accuracy of the determined data voltages Vg required by the blue sub-pixel and the sub-pixel of other colors, and reduce the absolute value of Vgs. As a result, it may be possible to reduce the difference between the negative drift rates of the driving transistors T2 in the blue sub-pixel and the sub-pixel of other colors while realizing the display of the black image.

The embodiments of the present disclosure does not limit a relationship between the magnitudes of the second maximum compensation voltage value ΔVmax2 corresponding to the red sub-pixel and the third maximum compensation voltage value ΔVmax3 corresponding to the green sub-pixel, which may be set according to actual situations.

In some examples, as shown in FIG. 8, the second maximum compensation voltage value ΔVmax2 and the third maximum compensation voltage value ΔVmax3 are substantially equal.

That is, the second maximum compensation voltage value ΔVmax2 and the third maximum compensation voltage value ΔVmax3 may be equal. Alternatively, there may be a small difference between the second maximum compensation voltage value ΔVmax2 and the third maximum compensation voltage value ΔVmax3.

In some embodiments, the plurality of sub-pixels 1 included in the display apparatus 1000 further include a white sub-pixel. Based on this, as shown in FIG. 8, the correspondence table between the threshold voltage Vth of the sub-pixel 1 and the compensation voltage ΔV further includes a correspondence relationship between a threshold voltage Vth of a white sub-pixel and the compensation voltage ΔV.

Here, by providing the white sub-pixels, it may be possible to improve a contrast and display quality of the display apparatus 1000.

In some examples, as shown in FIG. 8, the correspondence relationship corresponding to the white sub-pixel includes a fourth minimum threshold voltage endpoint value Vthmin4. In a case where the correspondence relationship corresponding to the blue sub-pixel includes the first minimum threshold voltage endpoint value Vthmin1, the first minimum threshold voltage endpoint value Vthmin1 is greater than the fourth minimum threshold voltage endpoint value Vthmin4.

According to research, the blue light emitted by the blue sub-pixel also affects a driving transistor T2 of a pixel driving circuit 11 in the white sub-pixel, which causes a threshold voltage of the driving transistor T2 in the white sub-pixel to drift negatively. However, the white light emitted by the white sub-pixel has substantially no effect on the driving transistor T2 of the pixel driving circuit 11 in all the sub-pixels 1, which substantially will not cause the threshold voltage of the driving transistor T2 in the sub-pixels 1 to drift negatively.

That is to say, the negative drift rate of the threshold voltage Vth of the driving transistor T2 in the blue sub-pixel is also lower than a negative drift rate of the threshold voltage Vth of the driving transistor T2 in the white sub-pixel. In a same time period, the degree to which the threshold voltage Vth of the driving transistor T2 in the blue sub-pixel drifts negatively is lower than a degree to which the threshold voltage Vth of the driving transistor T2 in the white sub-pixel drifts negatively.

Therefore, in the correspondence relationships corresponding to the sub-pixels of different colors, the first minimum threshold voltage endpoint value Vthmin1 corresponding to the blue sub-pixel is also greater than the fourth minimum threshold voltage endpoint value Vthmin4 corresponding to the white sub-pixel.

In some examples, as shown in FIG. 8, in a case where the correspondence relationship corresponding to the red sub-pixel includes the second minimum threshold voltage endpoint value Vthmin2, and the correspondence relationship corresponding to the green sub-pixel includes the third minimum threshold voltage endpoint value Vthmin3, the fourth minimum threshold voltage endpoint value Vthmin4 and the second minimum threshold voltage endpoint value Vthmin2 are substantially equal, and the fourth minimum threshold voltage endpoint value Vthmin4 and the third minimum threshold voltage endpoint value Vthmin3 are substantially equal.

That is, the fourth minimum threshold voltage endpoint value Vthmin4 and the second minimum threshold voltage endpoint value Vthmin2 may be equal. Alternatively, there may be a small difference between the fourth minimum threshold voltage endpoint value Vthmin4 and the second minimum threshold voltage endpoint value Vthmin2 due to unavoidable factors such as temperature.

In addition, the fourth minimum threshold voltage endpoint value Vthmin4 and the third minimum threshold voltage endpoint value Vthmin3 may be equal. Alternatively, there may be a small difference between the fourth minimum threshold voltage endpoint value Vthmin4 and the third minimum threshold voltage endpoint value Vthmin3 due to unavoidable factors such as temperature.

In some examples, as shown in FIG. 8, the correspondence relationship corresponding to the white sub-pixel further includes a fourth maximum compensation voltage value ΔVmax4. In a case where the correspondence relationship corresponding to the blue sub-pixel includes the first maximum compensation voltage value ΔVmax1, the first maximum compensation voltage value ΔVmax1 is less than the fourth maximum compensation voltage value ΔVmax4.

The negative drift rate of the threshold voltage Vth of the driving transistor T2 in the blue sub-pixel is lower than the negative drift rate of the threshold voltage Vth of the driving transistor T2 in the white sub-pixel. Therefore, by setting the maximum compensation voltage values in the correspondence relationships in different ways, it may be possible to increase the precision and accuracy of the acquired compensation voltages corresponding to sub-pixels of different colors, increase the precision and accuracy of the determined data voltages Vg corresponding to the sub-pixels of different colors, and reduce the absolute value of Vgs. In this way, it may be possible to reduce the difference between the negative drift rates of the driving transistors T2 in the sub-pixels of different colors while realizing the display of the black image.

In some examples, as shown in FIG. 8, in a case where the correspondence relationship corresponding to the red sub-pixel includes the second maximum compensation voltage value ΔVmax2, and the correspondence relationship corresponding to the green sub-pixel includes the third maximum compensation voltage value ΔVmax3, the fourth maximum compensation voltage value ΔVmax4 and the second maximum compensation voltage value ΔVmax2 are substantially equal, and the fourth maximum compensation voltage value ΔVmax4 and the third maximum compensation voltage value ΔVmax3 are substantially equal.

That is, the fourth maximum compensation voltage value ΔVmax4 and the second maximum compensation voltage value ΔVmax2 may be equal. Alternatively, there may be a small difference between the fourth maximum compensation voltage value ΔVmax4 and the second maximum compensation voltage value ΔVmax2.

In addition, the fourth maximum compensation voltage value ΔVmax4 and the third maximum compensation voltage value ΔVmax3 may be equal. Alternatively, there may be a small difference between the fourth maximum compensation voltage value ΔVmax4 and the third maximum compensation voltage value ΔVmax3.

In some embodiments, the correspondence table established in S100 further includes correspondence relationships between aging degrees of the sub-pixels of different colors and the compensation voltage.

In some examples, in a case where the plurality of sub-pixels 1 included in the display apparatus 1000 include the red sub-pixels, green sub-pixels, and blue sub-pixels, the correspondence table further includes: a correspondence relationship between an aging degree of the red sub-pixel and the compensation voltage, a correspondence relationship between an aging degree of the green sub-pixel and the compensation voltage, and a correspondence relationship between an aging degree of the blue sub-pixel and the compensation voltage. In a case where the plurality of sub-pixels further include the white sub-pixels, the correspondence table further includes a correspondence relationship between an aging degree of the white sub-pixel and the compensation voltage.

Figure 3:
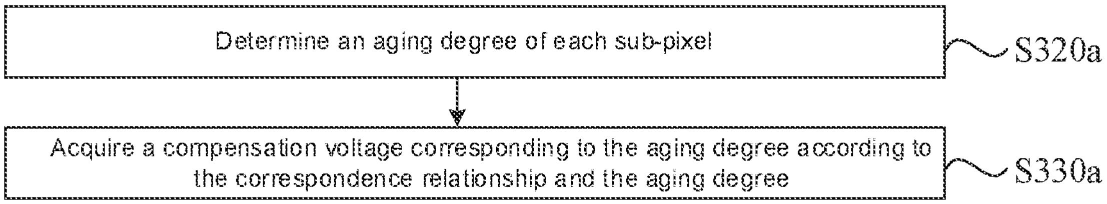
FIG. 3 is a flowchart of another image display method, in accordance with some embodiments of the present disclosure.

In some examples, as shown in FIG. 3, after S310, that is, after the color displayed by the sub-pixel 1 is determined, the image display method provided by the embodiments of the present disclosure further includes S320*a* to S330*a*.

In S320*a*, an aging degree of each sub-pixel 1 is determined.

For example, before the display apparatus 1000 leaves the factory, the display apparatus 1000 may be subjected to an aging test, so as to record the change of the aging parameters of the sub-pixel 1, form an aging rule of the sub-pixel 1, and establish a correspondence relationship between the aging degree of the sub-pixel 1 and the compensation voltage.

For example, the aging parameters may include, but are not limited to, a light-emitting luminance and a light-emitting duration of the sub-pixel 1. In this way, the aging rule of the sub-pixel 1 may be acquired by recording a relationship between the light-emitting duration and the light-emitting luminance (e.g. a target light-emitting luminance and an actual light-emitting luminance) of the sub-pixel 1. In the process of recording the aging rule of the sub-pixel 1, a compensation voltage ΔV may be provided, and the actual light-emitting luminance of the sub-pixel 1 may be detected and compared with the target light-emitting luminance, so as to acquire the correspondence relationship between the aging degree of the sub-pixel 1 and the compensation voltage.

It will be understood that, the aging rules of sub-pixels of different colors may be different. For example, an aging rate of a sub-pixel of one color is high, and an aging rate of a sub-pixel of another color is low. In this case, for the sub-pixels of the two colors, a changing trend of the compensation voltage ΔV as it changes as the aging degree changes is different.

Figure 9:
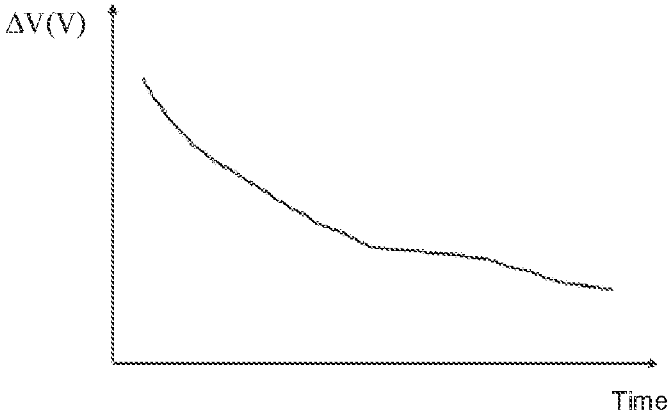
FIG. 9 is a diagram illustrating a relationship between a compensation voltage corresponding to a same sub-pixel and time, in accordance with some embodiments of the present disclosure.

For example, the aging degree of the sub-pixel 1 and the compensation voltage ΔV are negatively correlated. That is, as shown in FIG. 9, over time, the aging degree of the sub-pixel 1 gradually increases, but the compensation voltage ΔV gradually decreases. Here, the manner of reducing the compensation voltage ΔV may be set according to actual needs, which is not limited in the present disclosure, as long as the display apparatus 1000 may display the black image and the negative drift rate of the driving transistor T2 is reduced.

For example, as the aging degree of the sub-pixel 1 gradually increases, the compensation voltage ΔV decreases in a stepwise manner.

For example, in correspondence relationships of the sub-pixels of different colors, the compensation voltages ΔV may be decreased at different rates.

Optionally, the sub-pixel 1 further includes the light-emitting device 12. The aging degree of the sub-pixel 1 may refer to an aging degree of a light-emitting material of the light-emitting device 12 in the sub-pixel 1.

Figure 4:
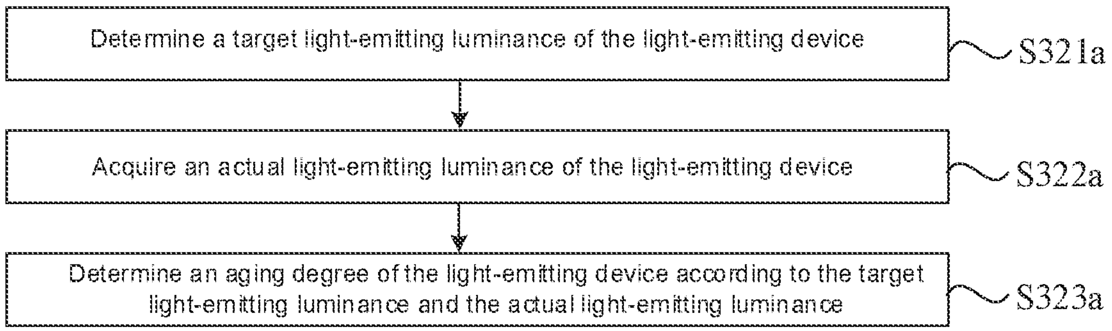
FIG. 4 is a flowchart of S320*a* in the flowchart shown in FIG. 3.

In this case, as shown in FIG. 4, in S320*a*, determining the aging degree of the sub-pixel 1 includes S321*a* to S323*a*.

In S321*a*, a target light-emitting luminance of the light-emitting device 12 is determined.

For example, in the display process of the display apparatus 1000, each sub-pixel 1 displays a respective grayscale when each frame of image is refreshed. According to the image to be displayed, a grayscale to be displayed by each sub-pixel 1 may be determined. That is, the target light-emitting luminance of the light-emitting device 12 of each sub-pixel 1 may be determined.

In S322*a*, an actual light-emitting luminance of the light-emitting device 12 is acquired.

For example, when the display apparatus 1000 displays a certain frame of image, the actual light-emitting luminance of the light-emitting device 12 may be acquired by an optical extraction manner.

For example, the actual light-emitting luminance of the light-emitting device 12 may be determined according to the aging rule of the sub-pixel 1 (i.e., the aging rule of the light-emitting material of the light-emitting device 12).

In S323*a*, an aging degree of the light-emitting device 12 is determined according to the target light-emitting luminance and the actual light-emitting luminance.

For example, after the target light-emitting luminance and the actual light-emitting luminance of the light-emitting device 12 are acquired, the target light-emitting luminance may be compared with the actual light-emitting luminance, so as to determine a magnitude of a difference between the target light-emitting luminance and the actual light-emitting luminance; and in turn, the aging degree of the light-emitting device 12 may be determined according to the magnitude of the difference between the target light-emitting luminance and the actual light-emitting luminance.

In S330*a*, a compensation voltage ΔV corresponding to the aging degree is acquired according to the correspondence relationship and the aging degree.

For example, each aging degree corresponds to a compensation voltage ΔV. After the color and the aging degree of the sub-pixel 1 are determined, the corresponding compensation voltage ΔV may be acquired according to the correspondence relationship corresponding to the sub-pixel of a corresponding color and the aging degree of the sub-pixel 1.

In some examples, determining the data voltage required by each sub-pixel 1 according to the acquired threshold voltage Vth and the acquired compensation voltage ΔV (S500) includes S500*a*.

In S500*a*, the data voltage Vg required by each sub-pixel 1 is determined according to the acquired threshold voltage Vth, the compensation voltage ΔV corresponding to the threshold voltage Vth and the compensation voltage ΔV corresponding to the aging degree.

Here, in the relationship (Vg=Vs+Vth−ΔV) satisfied by the data voltage Vg required by the sub-pixel 1, ΔV may be jointly determined by the compensation voltage ΔV corresponding to the threshold voltage Vth and the compensation voltage ΔV corresponding to the aging degree.

It will be understood that, according to the formula of the driving signal: $I=K\times(Vgs-Vth)^2$, it can be seen that, as the aging degree of the sub-pixel 1 increases, the driving signal I required for the sub-pixel 1 to display the target light-emitting luminance becomes larger, and accordingly, the voltage difference Vgs becomes larger. Therefore, in the case where the display apparatus 1000 is to display the black image, the driving signal I required by the sub-pixel 1 with a large aging degree (or with severe aging) may be large. Since a voltage value Vs is a constant value, it means that the data voltage Vg required by the sub-pixel 1 may be large. As a result, the data voltage Vg may be close to the voltage value Vs, and correspondingly, the compensation voltage ΔV may be small.

In the embodiments of the present disclosure, in the case where the display apparatus 1000 is to display the black image, by setting the compensation voltage ΔV to appropriate values, it may be possible to not only meet the requirement for displaying the black image, but also ensure that the data voltage Vg is a large value. As a result, the voltage difference Vgs is a small value, which may help further reduce the effect of NBTS on the driving transistor T2 and reduce the negative drift rate of the driving transistor T2.

Figure 10:
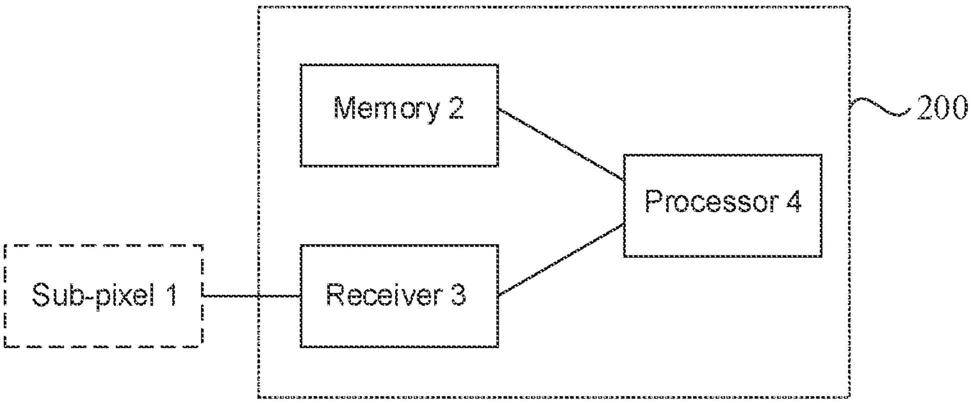
FIG. 10 is a structural diagram of an image display structure, in accordance with some embodiments of the present disclosure.

Some embodiments of the present disclosure provide an image display structure 200, as shown in FIG. 10, the image display structure 200 includes a memory 2, a receiver 3 and a processor 4.

For example, the image display structure 200 may be used to implement the image display method described above.

In some examples, a correspondence table is stored in the memory 2. The correspondence table includes at least one adjustment interval A. The adjustment interval A includes a first threshold voltage endpoint value Vth1 and a second threshold voltage endpoint value Vth2, and the first threshold voltage endpoint value Vth1 is less than the second threshold voltage endpoint value Vth2. In the adjustment interval A, a compensation voltage ΔV is a constant value.

For example, the correspondence table is the correspondence table established in S100 in the image display method. The memory 2 may store the correspondence table.

For example, the correspondence table may be stored in the memory 2 in advance before the display apparatus 1000 leaves the factory.

In some examples, as shown in FIGS. 10 and 11, the receiver 3 is electrically connected to a plurality of sub-pixels 1 in the display apparatus 1000, and the receiver 3 is configured to acquire a threshold voltage Vth of each sub-pixel 1.

For example, the receiver 3 is electrically connected to a pixel driving circuit 11 in each sub-pixel 1. Specifically, the receiver 3 may be electrically connected to a second electrode of a sensing transistor T3 in the pixel driving circuit 11, for example, through a sensing signal terminal Sense.

Here, acquiring the threshold voltage Vth of each sub-pixel 1 may be, for example, after the sensing transistor T3 in the pixel driving circuit 11 acquires the threshold voltage Vth of the driving transistor T2, acquiring, by the receiver 3, the threshold voltage Vth acquired by the sensing transistor T3 through the sensing signal terminal Sense.

In some examples, as shown in FIG. 10, the processor 4 is electrically connected to the memory 2 and the receiver 3. The processor 4 may read the information in the correspondence table stored in the memory 2, and may also read the threshold voltage Vth acquired by the receiver 3.

For example, the processor 4 is configured to: determine an adjustment interval A in which the threshold voltage Vth is located according to the correspondence table; acquire a compensation voltage ΔV corresponding to the threshold voltage Vth according to the correspondence table and the adjustment interval A; and then, in a case where the display apparatus 1000 is to display a black image, determine a data voltage Vg required by the sub-pixel 1 according to the threshold voltage Vth and the compensation voltage ΔV.

For example, the processor 4 may process the information read thereby. That is, the processor 4 may process the threshold voltage Vth read from the receiver 3 and the correspondence table read from the memory 2, so as to determine the data voltage Vg required by the sub-pixel 1.

Beneficial effects that may be achieved by the image display structure 200 provided in some embodiments of the present disclosure are the same as beneficial effects that can be achieved by the image display method provided in the embodiments described above, and details will not be repeated here.

In some embodiments, the plurality of sub-pixels 1 included in the display apparatus 1000 include a red sub-pixel, a green sub-pixel, and a blue sub-pixel. The correspondence table includes correspondence relationships between threshold voltages Vth of sub-pixels of different colors and the compensation voltage ΔV.

Based on this, the processor 4 is further configured to: determine a color displayed by the sub-pixel 1; determine a correspondence relationship corresponding to the color displayed by the sub-pixel 1; and determine the adjustment interval A in which the threshold voltage Vth is located in the correspondence relationship according to the threshold voltage Vth.

That is, in a case where the plurality of sub-pixels 1 include sub-pixels of a plurality of colors, the processor 4 may further process the threshold voltage Vth read from the receiver 3 and the correspondence table read from the memory 2, so as to determine the color of the sub-pixel 1 to which the acquired threshold voltage Vth belongs, a correspondence relationship corresponding to the color of the sub-pixel 1, and an adjustment interval A in which the acquired threshold voltage Vth is located in the correspondence relationship.

In some embodiments, the correspondence table further includes correspondence relationships between aging degrees of the sub-pixels of different colors and the compensation voltages.

Based on this, the processor 4 is further configured to: after the color displayed by the sub-pixel 1 is determined, determine an aging degree of the sub-pixel 1; and acquire a compensation voltage ΔV corresponding to the aging degree according to the correspondence relationship and the aging degree. After the compensation voltage ΔV corresponding to the aging degree is acquired, the processor 4 is further configured to: determine the data voltage Vg required by the sub-pixel 1 according to the threshold voltage Vth, the compensation voltage ΔV corresponding to the threshold voltage Vth, and the compensation voltage ΔV corresponding to the aging degree.

That is, the processor 4 may further process the threshold voltage Vth read from the receiver 3 and the correspondence table read from the memory 2, and determine the data voltage Vg required by the sub-pixel 1 according to the acquired threshold voltage Vth, the compensation voltage ΔV corresponding to the threshold voltage Vth, and the compensation voltage ΔV corresponding to the aging degree.

A structure of the display apparatus 1000 provided in some embodiments of the present disclosure will be described below.

In some embodiments, as shown in FIGS. 11 and 12, the display apparatus 1000 further includes: the image display structure 200 as described in some of the above embodiments, a timing controller 300 and a source driver 400.

In some examples, as shown in FIGS. 11 and 12, the timing controller 300 is electrically connected to the processor 4 in the image display structure 200. The source driver 400 is electrically connected to the timing controller 300. The timing controller 300 is configured to receive a data voltage Vg determined by the processor 4, generate a source control signal according to the data voltage Vg, and transmit the source control signal to the source driver 400. The source driver 400 is configured to generate a signal corresponding to the data voltage Vg according to the source control signal.

For example, after the processor 4 determines the data voltage Vg required for the display apparatus 1000 to display the black image, the data voltage Vg may be transmitted to the timing controller 300 as a target value. After receiving the data voltage Vg, the timing controller 300 may generate a corresponding source control signal according to the data voltage Vg.

After receiving the source control signal, the source driver 400 may generate a corresponding signal. The signal is a data signal, and a voltage of the data signal corresponds to the data voltage Vg.

For example, as shown in FIGS. 11 and 12, the source driver 400 is further electrically connected to the pixel driving circuit 11 in the sub-pixel 1. After generating the data signal, the source driver 400 transmits the data signal to the pixel driving circuit 11 in the sub-pixel 1.

Beneficial effects that may be achieved by the display apparatus 1000 provided by some embodiments of the present disclosure are the same as the beneficial effects that can be achieved by the image display method provided by some of the above embodiments, and details will not be repeated here.

In some embodiments, as shown in FIG. 12, the display apparatus 1000 further includes a main board 500 electrically connected to the display substrate 100. The main board 500 may be electrically connected to the display substrate 100 through, for example, chip on film (COF).

In some examples, as shown in FIG. 12, the image display structure 200 is disposed in the main board 500.

In this way, it may be conductive to improving a degree of integration of the display apparatus 1000.

Some embodiments of the present disclosure provide a computer-readable storage medium. The computer-readable storage medium has stored thereon computer program instructions that, when running, cause a computer to execute the image display method as described in any of the above embodiments.

For example, the computer-readable storage medium includes, but is not limited to, a magnetic storage device (e.g., a hard disk, a floppy disk or a magnetic tape), an optical disk (e.g., a compact disk (CD), a digital versatile disk (DVD)), a smart card, and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" includes, but is not limited to, wireless channels and various other media capable of storing, containing, and/or carrying instruction(s) and/or data.

Beneficial effects of the computer-readable storage medium are the same as the beneficial effects of the image display method as described in some of the above embodiments, and details will be not repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image display method, applied to a display apparatus, the display apparatus including a plurality of sub-pixels, the image display method comprising:

establishing a correspondence table between a threshold voltage of a sub-pixel and a compensation voltage; the correspondence table including at least one adjustment interval, wherein an adjustment interval includes a first threshold voltage endpoint value and a second threshold voltage endpoint value, the first threshold voltage endpoint value is less than the second threshold voltage endpoint value, and in the adjustment interval, the compensation voltage being a constant value;

acquiring a threshold voltage of each sub-pixel;

determining an adjustment interval in which the acquired threshold voltage is located according to the correspondence table;

acquiring a compensation voltage corresponding to the acquired threshold voltage according to the correspondence table and the determined adjustment interval; and determining, in a case where the display apparatus is to display a black image, a data voltage required by each sub-pixel according to the acquired threshold voltage and the acquired compensation voltage.

2. The image display method according to claim 1, wherein the at least one adjustment interval includes a plurality of adjustment intervals;

two adjacent adjustment intervals are respectively a first adjustment interval and a second adjustment interval;

an average value of threshold voltages corresponding to the first adjustment interval is less than an average value of threshold voltages corresponding to the second adjustment interval; and a compensation voltage corresponding to the first adjustment interval is less than a compensation voltage corresponding to the second adjustment interval.

3. The image display method according to claim 1, wherein the plurality of sub-pixels include a red sub-pixel, a green sub-pixel and a blue sub-pixel;

the correspondence table includes correspondence relationships between threshold voltages of sub-pixels of different colors and the compensation voltage;

determining the adjustment interval in which the acquired threshold voltage is located includes:

determining a color displayed by each sub-pixel;

determining a correspondence relationship corresponding to the color displayed by each sub-pixel; and determining the adjustment interval in which the acquired threshold voltage is located in the correspondence relationship according to the acquired threshold voltage.

4. The image display method according to claim 3, wherein a correspondence relationship corresponding to the blue sub-pixel includes a first minimum threshold voltage endpoint value;

a correspondence relationship corresponding to the red sub-pixel includes a second minimum threshold voltage endpoint value; and a correspondence relationship corresponding to the green sub-pixel includes a third minimum threshold voltage endpoint value, wherein the first minimum threshold voltage endpoint value is greater than the second minimum threshold voltage endpoint value;

the first minimum threshold voltage endpoint value is greater than the third minimum threshold voltage endpoint value; and the second minimum threshold voltage endpoint value and the third minimum threshold voltage endpoint value are substantially equal.

5. The image display method according to claim 3, wherein a correspondence relationship corresponding to the blue sub-pixel includes a first maximum compensation voltage value;

a correspondence relationship corresponding to the red sub-pixel includes a second maximum compensation voltage value; and a correspondence relationship corresponding to the green sub-pixel includes a third maximum compensation voltage value, wherein the first maximum compensation voltage value is less than the second maximum compensation voltage value;

the first maximum compensation voltage value is less than the third maximum compensation voltage value; and the second maximum compensation voltage value and the third maximum compensation voltage value are substantially equal.

6. The image display method according to claim 3, wherein the plurality of sub-pixels further include a white sub-pixel;

a correspondence relationship corresponding to the white sub-pixel includes a fourth minimum threshold voltage endpoint value, wherein a correspondence relationship corresponding to the blue sub-pixel includes a first minimum threshold voltage endpoint value, a correspondence relationship corresponding to the red sub-pixel includes a second minimum threshold voltage endpoint value, and a correspondence relationship corresponding to the green sub-pixel includes a third minimum threshold voltage endpoint value, the first minimum threshold voltage endpoint value is greater than the fourth minimum threshold voltage endpoint value;

the fourth minimum threshold voltage endpoint value and the second minimum threshold voltage endpoint value are substantially equal; and the fourth minimum threshold voltage endpoint value and the third minimum threshold voltage endpoint value are substantially equal.

7. The image display method according to claim 6, wherein the correspondence relationship corresponding to the white sub-pixel includes a fourth maximum compensation voltage value, wherein a correspondence relationship corresponding to the blue sub-pixel includes a first maximum compensation voltage value, a correspondence relationship corresponding to the red sub-pixel includes a second maximum compensation voltage value, and a correspondence relationship corresponding to the green sub-pixel includes a third maximum compensation voltage value, the first maximum compensation voltage value is less than the fourth maximum compensation voltage value;

the fourth maximum compensation voltage value and the second maximum compensation voltage value are substantially equal; and the fourth maximum compensation voltage value and the third maximum compensation voltage value are substantially equal.

8. The image display method according to claim 3, wherein the correspondence table further includes correspondence relationships between aging degrees of the sub-pixels of different colors and the compensation voltage;

after the color displayed by each sub-pixel is determined, the image display method further comprises:

determining an aging degree of each sub-pixel; and acquiring a compensation voltage corresponding to the aging degree according to the correspondence relationships and the aging degree, wherein determining the data voltage required by each sub-pixel according to the acquired threshold voltage and the acquired compensation voltage includes:

determining the data voltage required by each sub-pixel according to the acquired threshold voltage, the compensation voltage corresponding to the acquired threshold voltage, and the compensation voltage corresponding to the aging degree.

9. The image display method according to claim 8, wherein the aging degree of each sub-pixel and the compensation voltage corresponding to the aging degree are negatively correlated.

10. The image display method according to claim 8, wherein each sub-pixel includes a light-emitting device;

determining the aging degree of each sub-pixel includes:

determining a target light-emitting luminance of the light-emitting device;

acquiring an actual light-emitting luminance of the light-emitting device; and determining an aging degree of the light-emitting device according to the target light-emitting luminance and the actual light-emitting luminance.

11. The image display method according to claim 1, wherein acquiring the threshold voltage of each sub-pixel includes:

acquiring the threshold voltage of each sub-pixel when the display apparatus performs a power-off operation; and determining the data voltage required by each sub-pixel includes:

determining the data voltage after the display apparatus performs the power-off operation and before the display apparatus performs a power-on operation.

12. The image display method according to claim 1, wherein each sub-pixel includes:

a switching transistor, a driving transistor and a sensing transistor;

acquiring the threshold voltage of each sub-pixel includes:

acquiring a threshold voltage of the driving transistor through the sensing transistor.

13. An image display structure, comprising:

a memory having stored thereon a correspondence table, the correspondence table including at least one adjustment interval, wherein an adjustment interval includes a first threshold voltage endpoint value and a second threshold voltage endpoint value, the first threshold voltage endpoint value is less than the second threshold voltage endpoint value, and in the adjustment interval, a compensation voltage is a constant value;

a receiver electrically configured to be connected to a plurality of sub-pixels in a display apparatus, wherein the receiver is further configured to acquire a threshold voltage of each sub-pixel; and a processor electrically connected to the memory and the receiver, wherein the processor is configured to: determine an adjustment interval in which the acquired threshold voltage is located according to the correspondence table; acquire a compensation voltage corresponding to the acquired threshold voltage according to the correspondence table and the determined adjustment interval; and then determine, in a case where the display apparatus is to display a black image, a data voltage required by each sub-pixel according to the acquired threshold voltage and the acquired compensation voltage.

14. The image display structure according to claim 13, wherein the plurality of sub-pixels include a red sub-pixel, a green sub-pixel and a blue sub-pixel;

the correspondence table includes correspondence relationships between threshold voltages of sub-pixels of different colors and the compensation voltage;

the processor is configured to: determine a color displayed by each sub-pixel;

determine a correspondence relationship corresponding to the color displayed by each sub-pixel; and determine the adjustment interval in which the acquired threshold voltage is located in the correspondence relationship according to the acquired threshold voltage.

15. The image display structure according to claim 14, wherein the correspondence table further includes correspondence relationships between aging degrees of the sub-pixels of different colors and the compensation voltage;

the processor is further configured to:

after the color displayed by each sub-pixel is determined, determine an aging degree of each sub-pixel; and acquire a compensation voltage corresponding to the aging degree according to the correspondence relationships and the aging degree; and the processor is further configured to:

determine the data voltage required by each sub-pixel according to the acquired threshold voltage, the compensation voltage corresponding to the acquired threshold voltage, and the compensation voltage corresponding to the aging degree.

16. A display apparatus, comprising:

a display substrate including a plurality of sub-pixels;

the image display structure according to claim 13;

a timing controller electrically connected to the processor in the image display structure, the timing controller being configured to receive the data voltage determined by the processor and generate a source control signal according to the data voltage; and a source driver electrically connected to the timing controller, the source driver being configured to generate a signal corresponding to the data voltage according to the source control signal.

17. The display apparatus according to claim 16, further comprising:

a main board electrically connected to the display substrate, wherein the image display structure is arranged in the main board.

18. A non-transitory computer-readable storage medium, wherein the computer-readable storage medium has stored thereon computer program instructions that, when running, cause a computer to execute the image display method according to claim 1.

* * * * *